March 7, 1933.  1,899,936
J. BRICKEN, NOW BY JUDICIAL CHANGE OF NAME J. G. BEAVER
TYPEWRITING AND CALCULATING MACHINE
Filed May 4, 1931   17 Sheets-Sheet 1
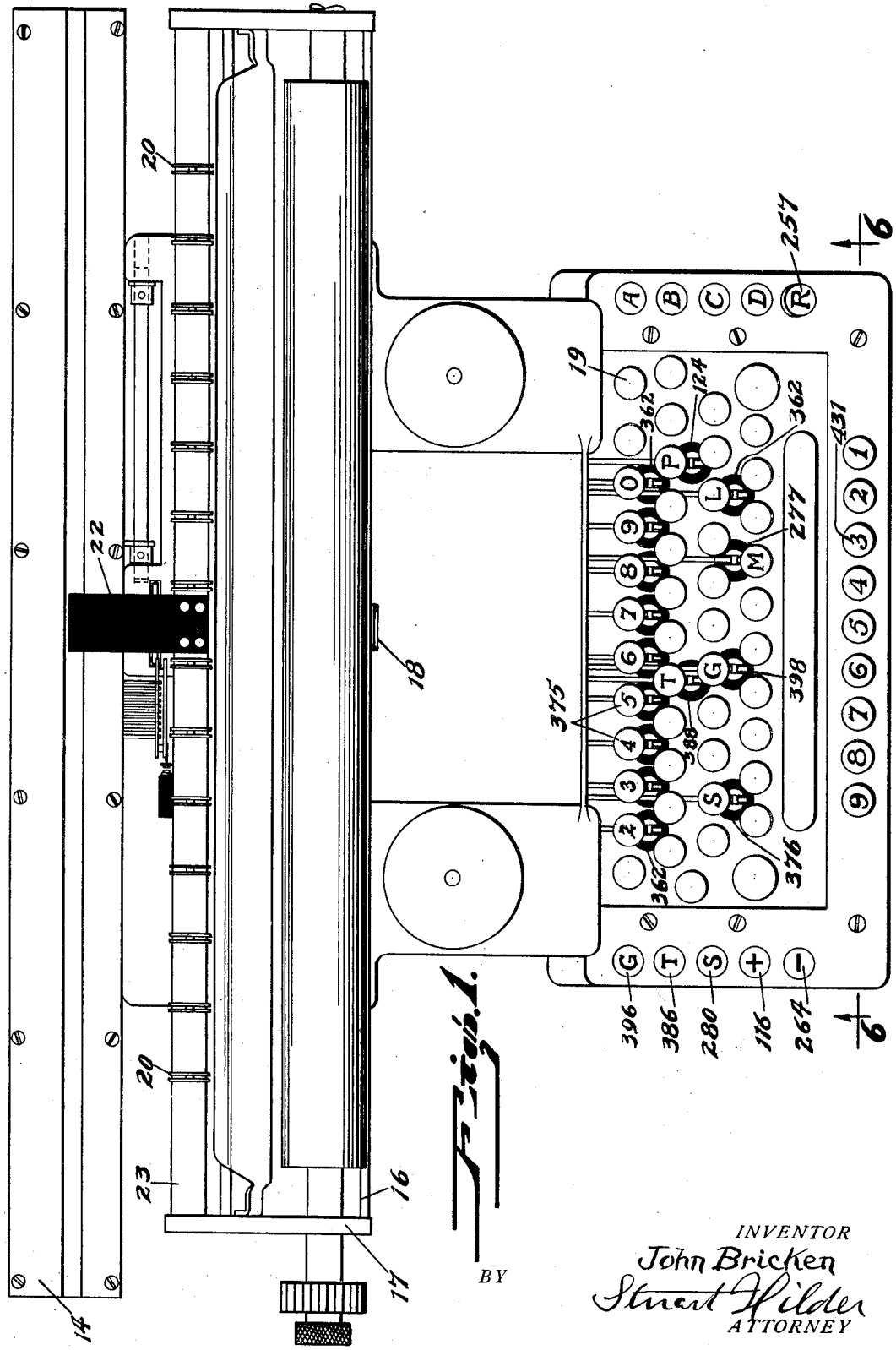
*INVENTOR*
*John Bricken*
BY *Stuart Wilder*
*ATTORNEY*

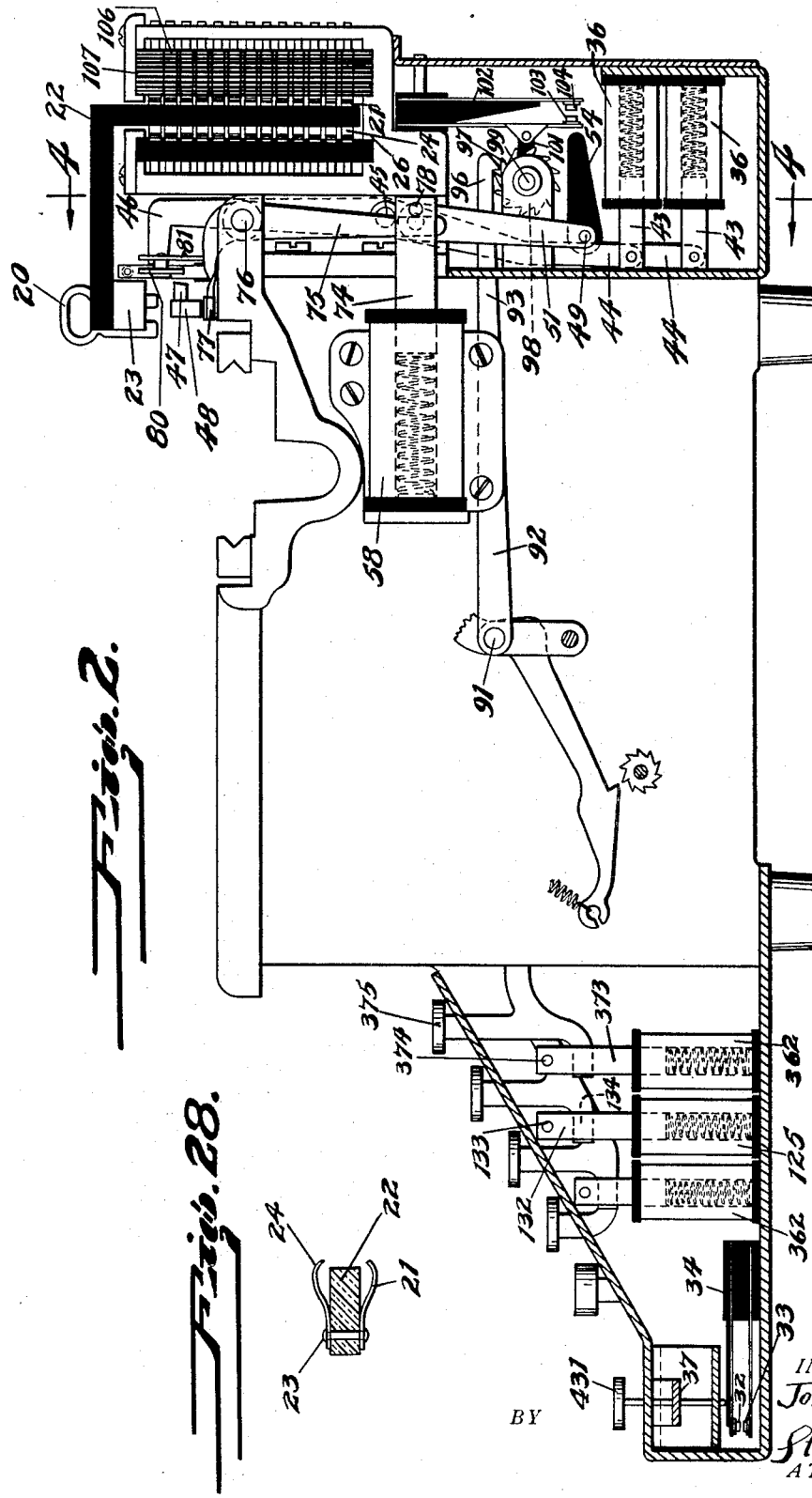

March 7, 1933.  1,899,936
J. BRICKEN, NOW BY JUDICIAL CHANGE OF NAME J. G. BEAVER
TYPEWRITING AND CALCULATING MACHINE
Filed May 4, 1931  17 Sheets-Sheet 3
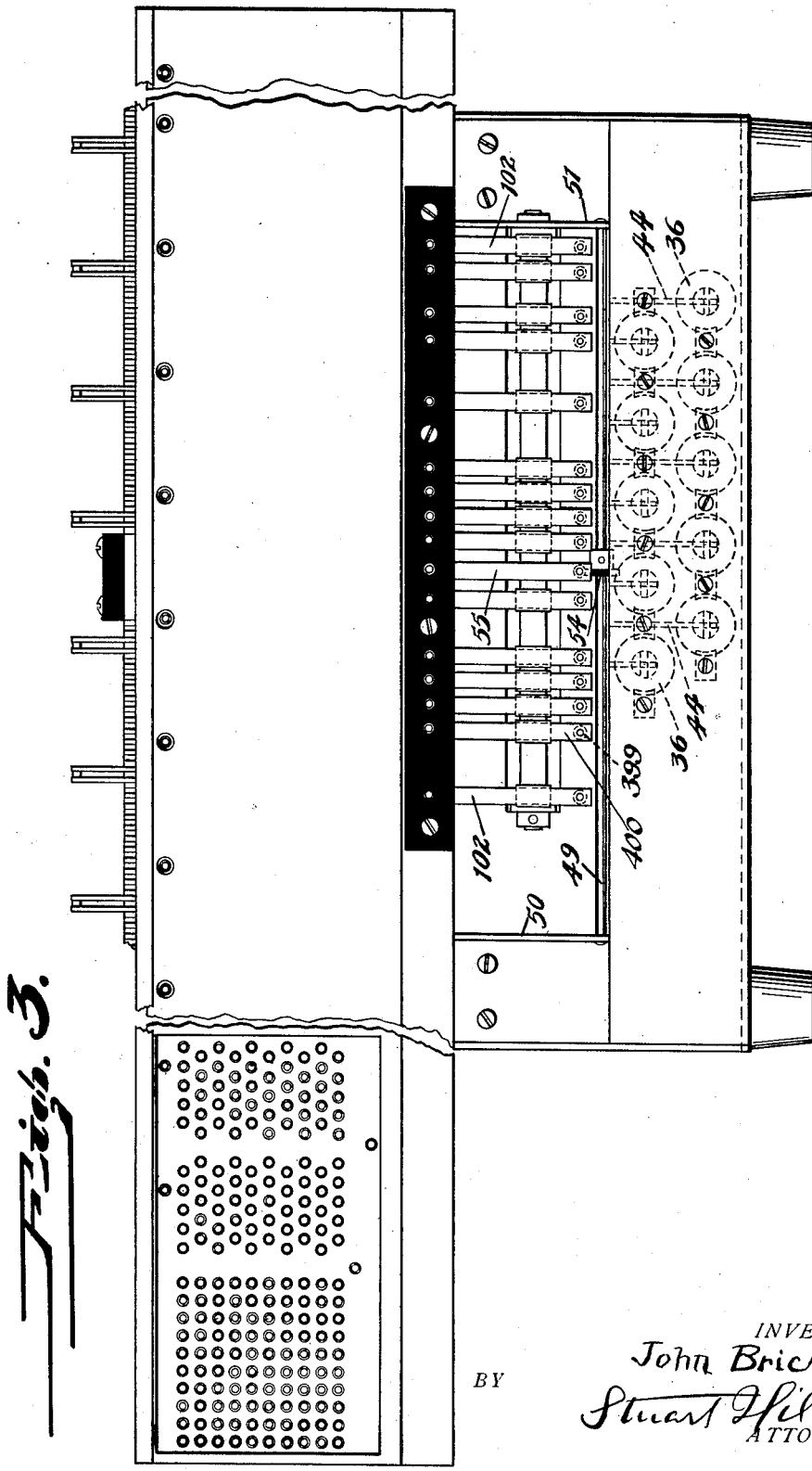
INVENTOR
John Bricken
BY
Stuart Hilder
ATTORNEY March 7, 1933.　　　　　　　　　　　　　　　　1,899,936
J. BRICKEN, NOW BY JUDICIAL CHANGE OF NAME J. G. BEAVER
TYPEWRITING AND CALCULATING MACHINE
Filed May 4, 1931　　　17 Sheets-Sheet 4
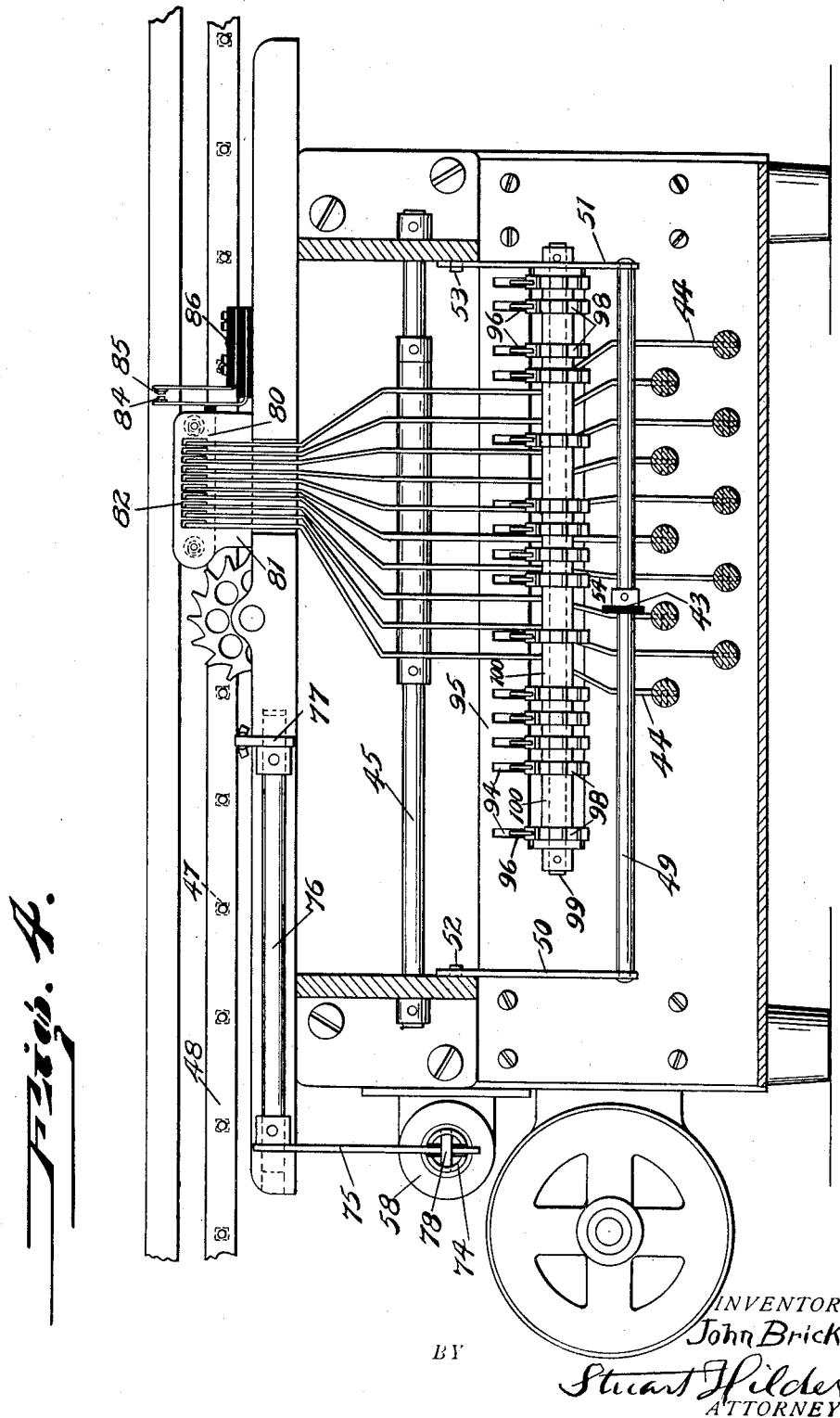
INVENTOR
John Bricken
BY Stuart Wilder
ATTORNEY March 7, 1933.　　　　　　　　　　　　　　　　1,899,936
J. BRICKEN, NOW BY JUDICIAL CHANGE OF NAME J. G. BEAVER
TYPEWRITING AND CALCULATING MACHINE
Filed May 4, 1931　　　17 Sheets-Sheet 5
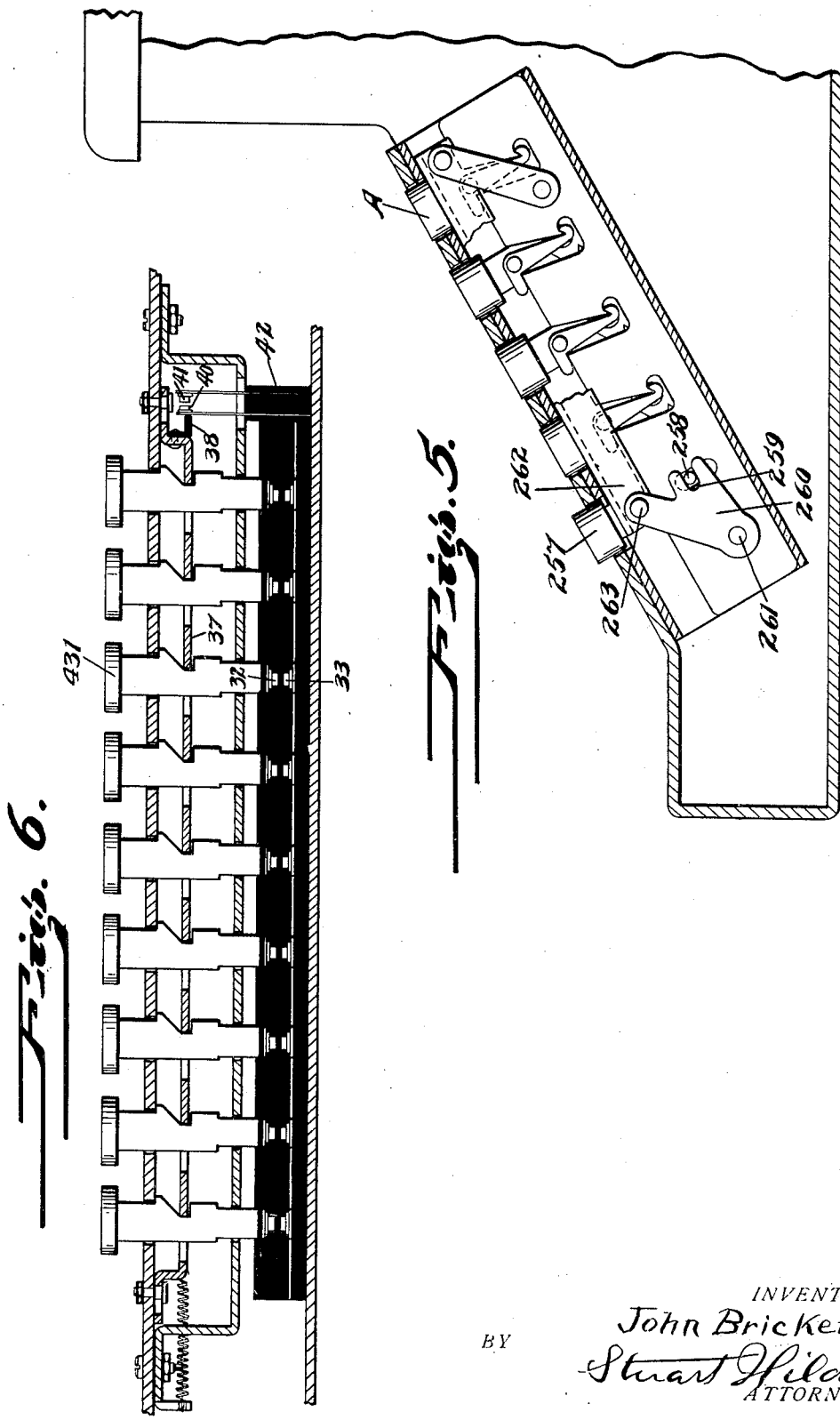
INVENTOR
John Bricken
BY
Stuart Wilder.
ATTORNEY

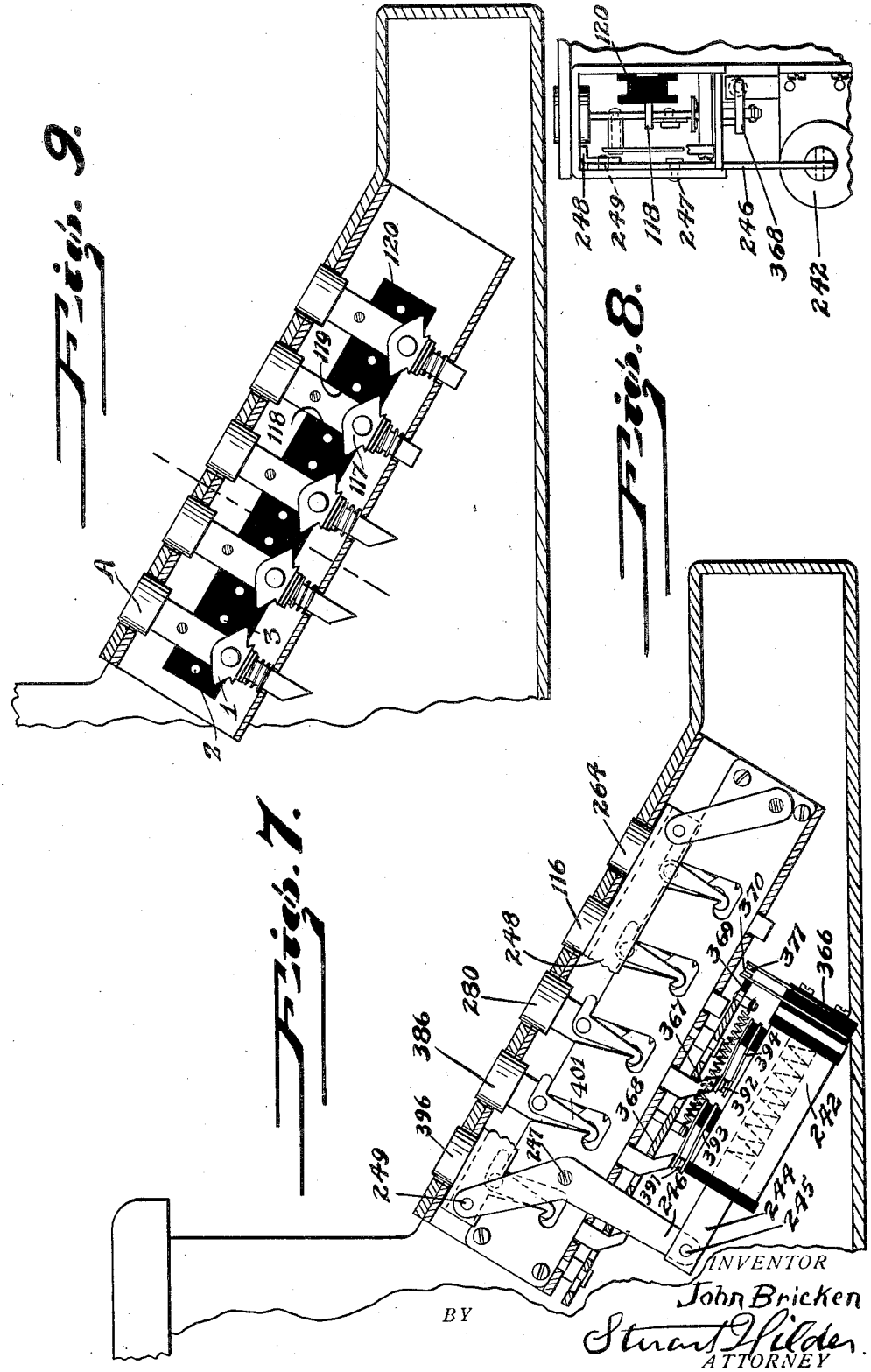

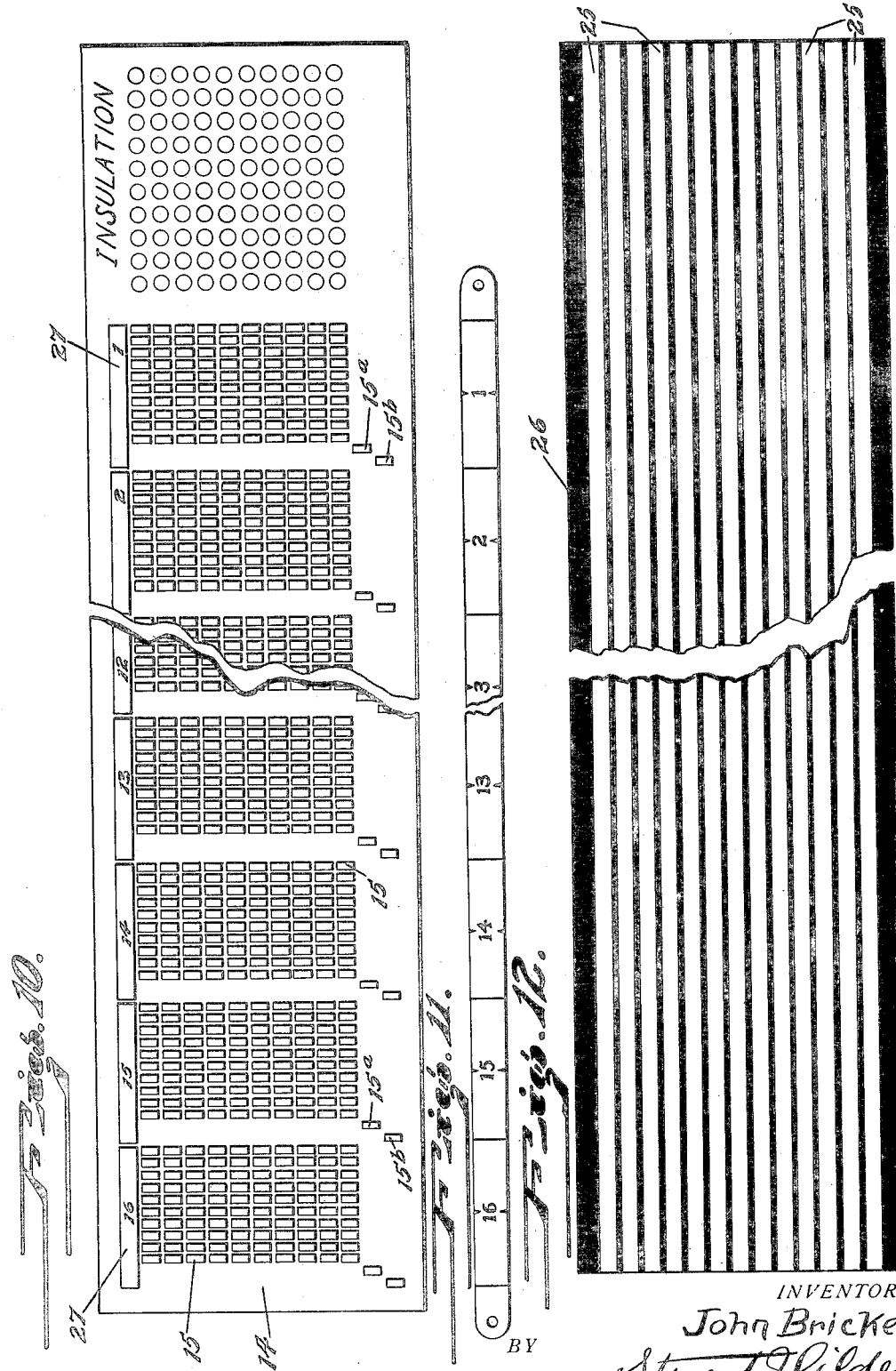

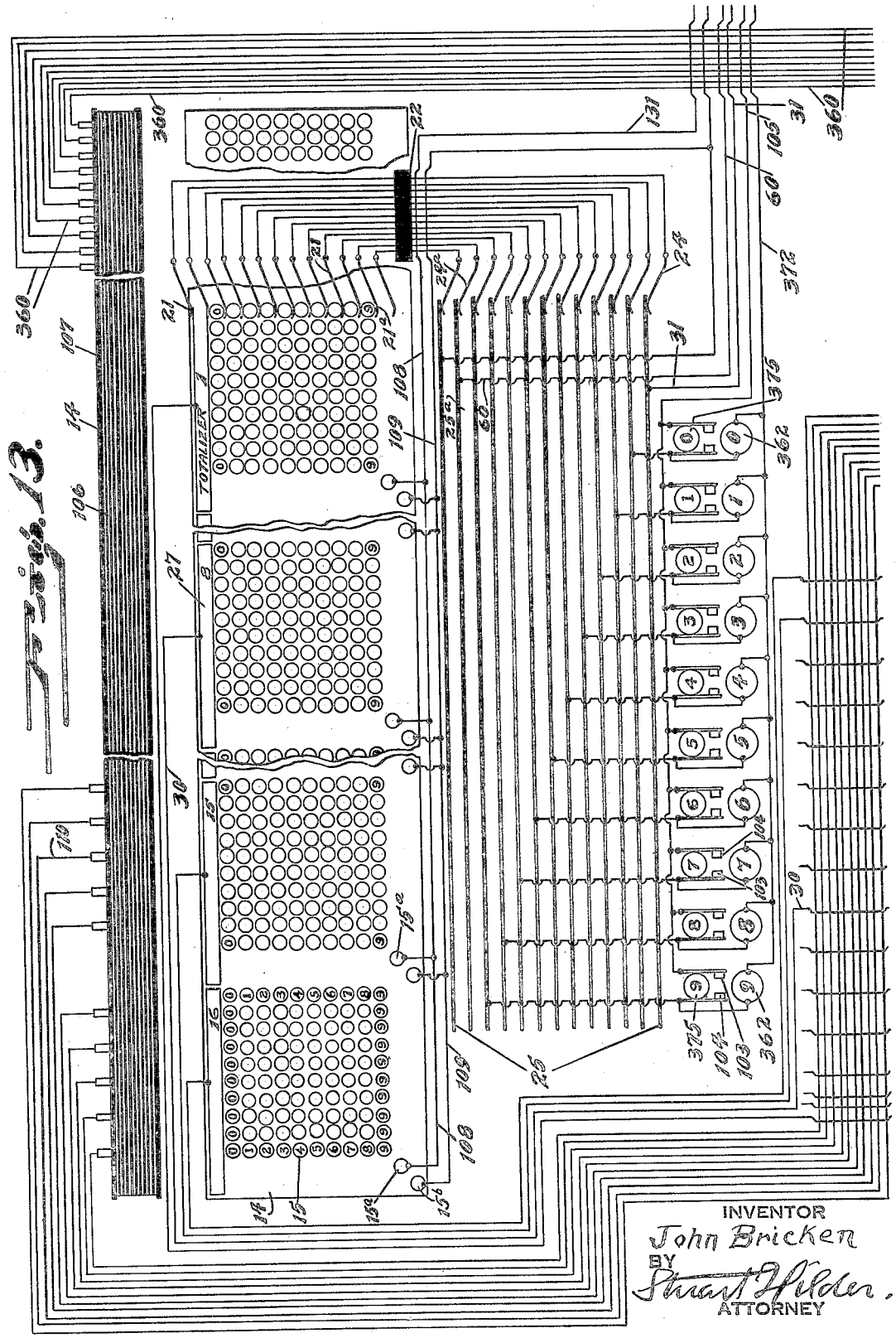

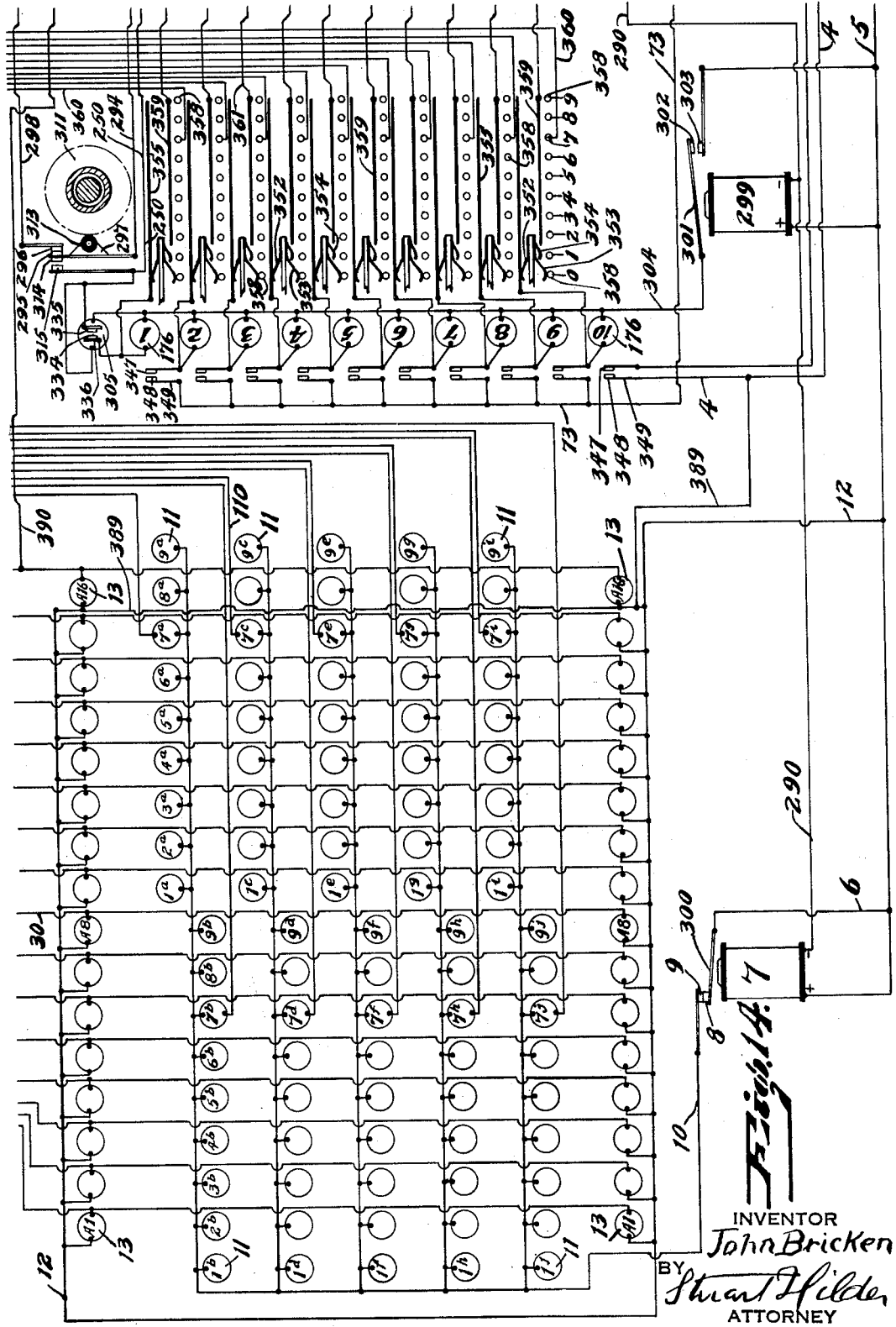

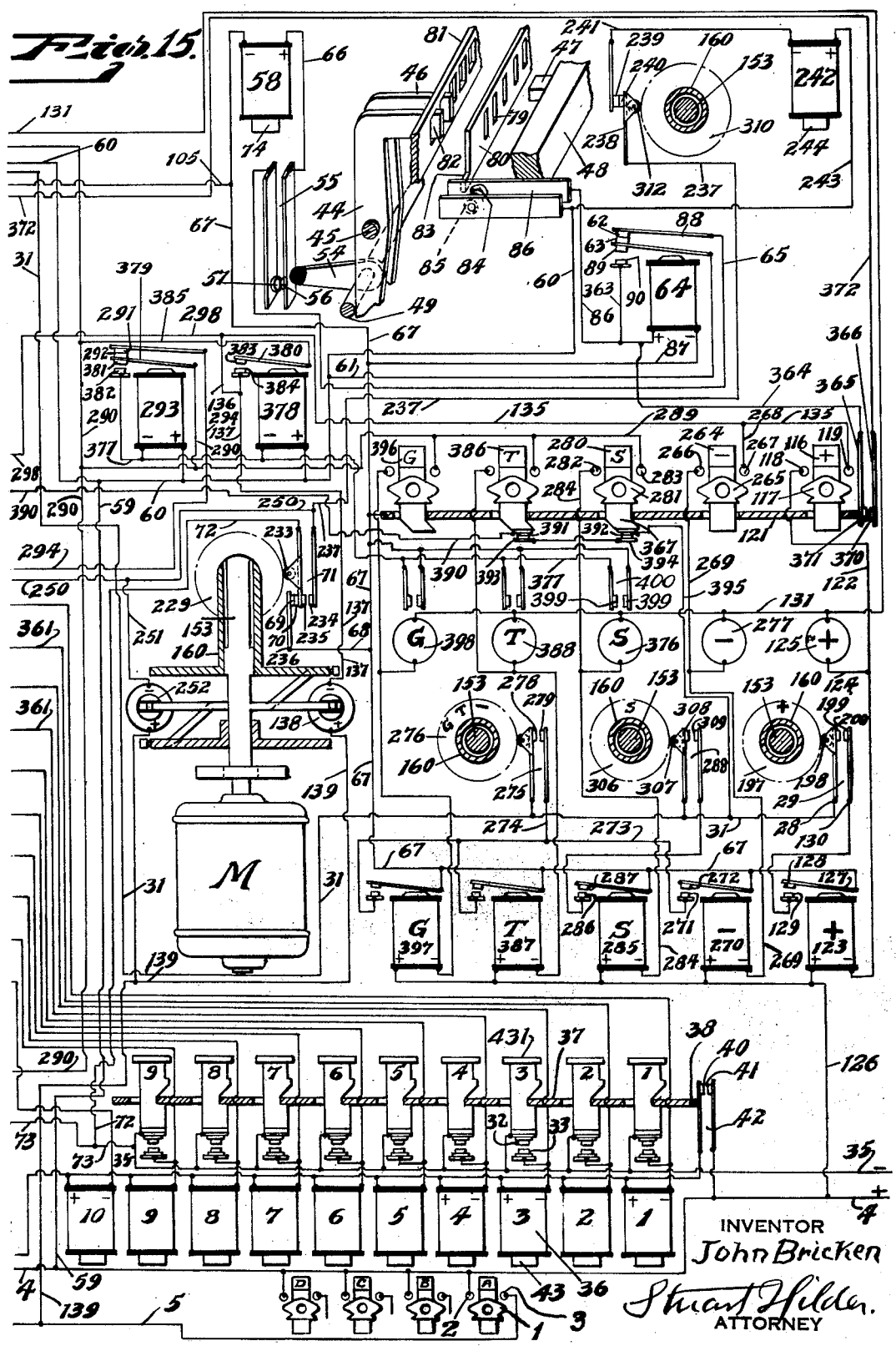

March 7, 1933.  1,899,936
J. BRICKEN, NOW BY JUDICIAL CHANGE OF NAME J. G. BEAVER
TYPEWRITING AND CALCULATING MACHINE
Filed May 4, 1931    17 Sheets-Sheet 14
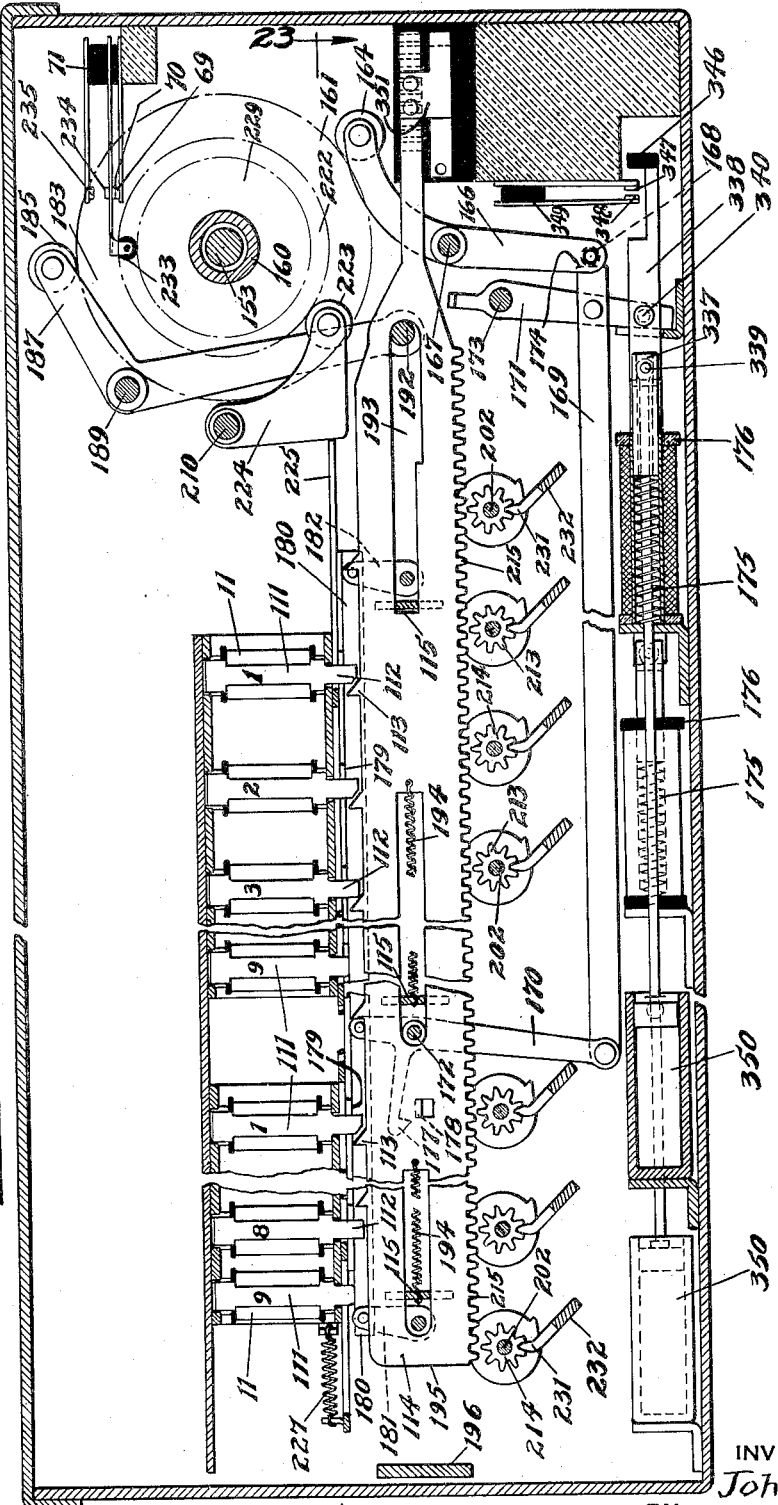
INVENTOR
John Bricken
BY
Stuart Wilder
ATTORNEY

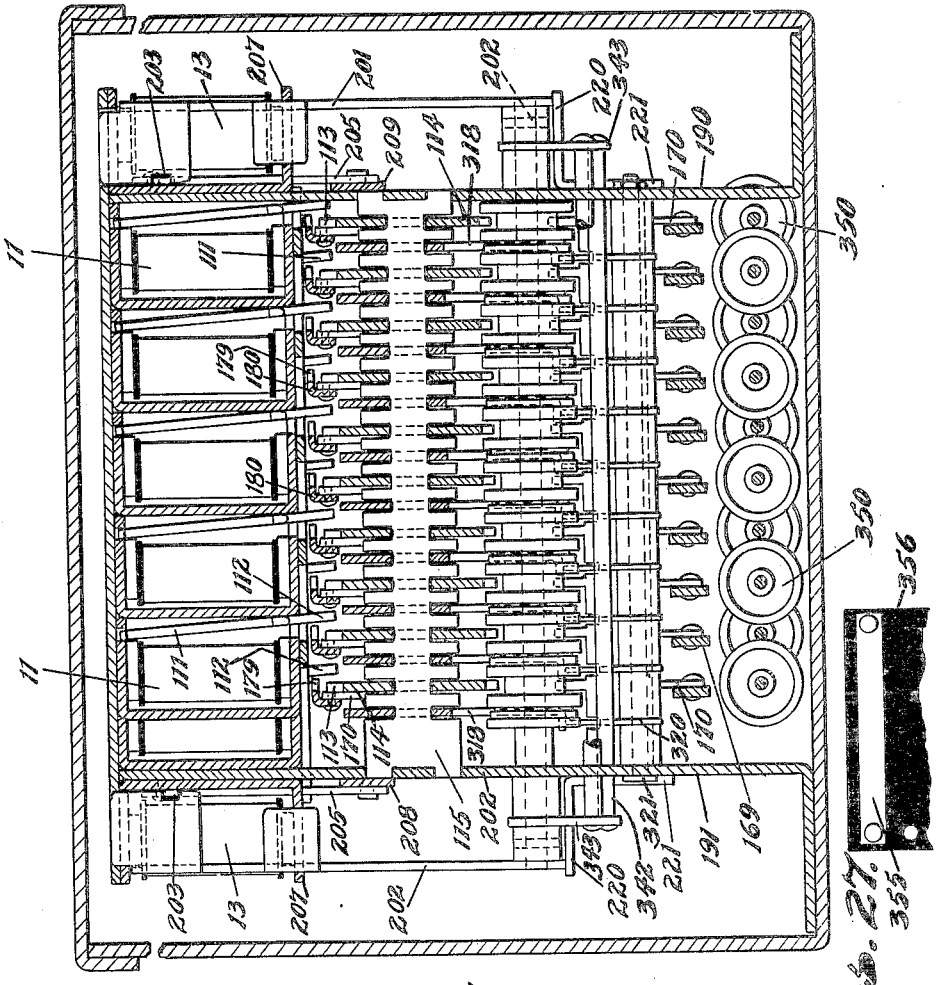

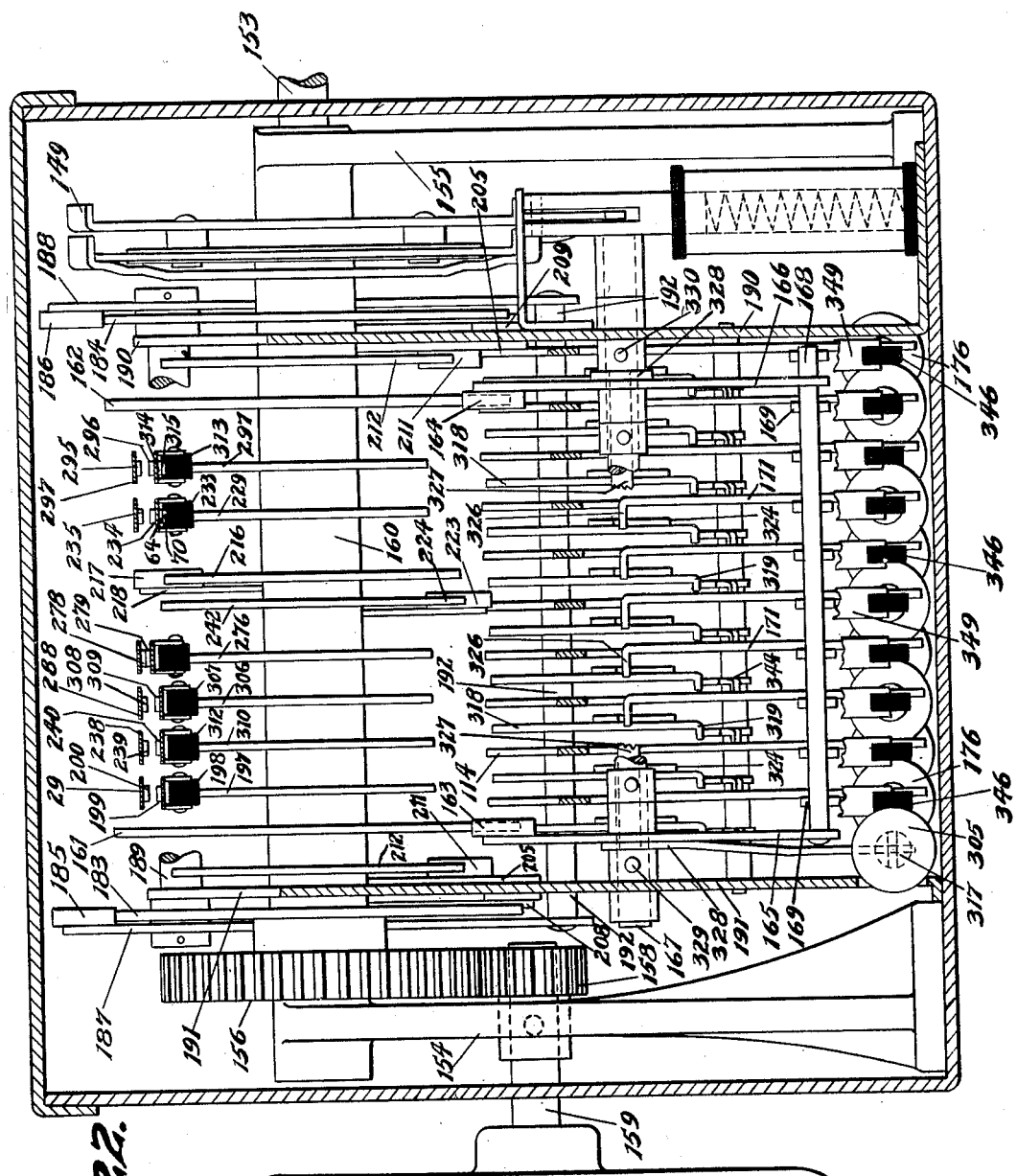

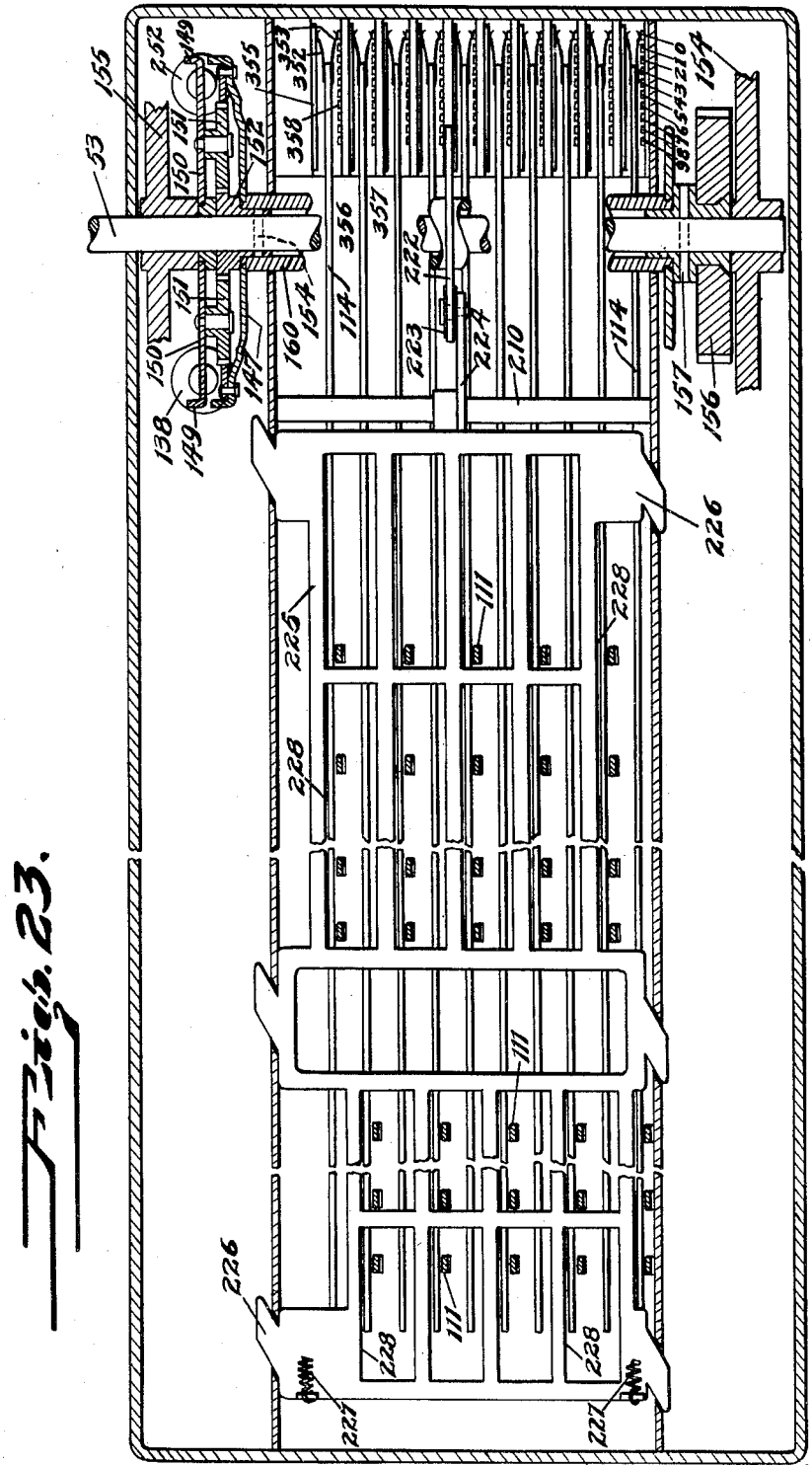

Patented Mar. 7, 1933

1,899,936

UNITED STATES PATENT OFFICE

JOHN BRICKEN, NOW BY JUDICIAL CHANGE OF NAME JOHN GEORGE BEAVER, OF EAST ORANGE, NEW JERSEY, ASSIGNOR TO MONROE CALCULATING MACHINE COMPANY, OF ORANGE, NEW JERSEY, A CORPORATION OF DELAWARE

TYPEWRITING AND CALCULATING MACHINE

Application filed May 4, 1931. Serial No. 534,925.

The invention relates to improvements in registering mechanism involving the combination of typewriter and calculating mechanisms.

An object of the invention is to provide a plurality of totalizers adapted to be selectively operated.

The invention is shown in combination with the Woodstock Electrite typewriter but is adaptable to be used in combination with various other typewriting machines.

Reference is also made to the following patents: U. S. Patent No. 1,614,475 issued January 18, 1927 to O. A. Hokanson, entitled Power actuated typewriter.

British Patent No. 272,569, to E. C. R. Marks, accepted June 7, 1927, entitled Improvements in or relating to totalizing counters of calculating machines.

U. S. Patent application Serial No. 518,935, filed February 28, 1931, by John Bricken, entitled Calculating machine.

The invention consists in the novel construction and combination of parts, as set forth in the appended claims.

In the accompanying drawings:

Fig. 1 is a plan view of the typewriter, showing the operating keys.

Fig. 2 is a right hand elevation of the typewriter, with side frame removed.

Fig. 3 is a rear view of the typewriter.

Fig. 4 is a cross sectional view, taken substantially on line 4—4 of Fig. 2.

Fig. 5 is a right hand elevation of the unit selecting keys.

Fig. 6 is a cross sectional view, taken substantially on line 6—6 of Fig. 1 showing the denominational selecting keys and associated mechanism.

Fig. 7 is a left hand elevation showing the operation selecting keys and associated mechanism.

Fig. 8 is a rear elevation of the operation selecting keys.

Fig. 9 is an elevation of the operating and denominational selecting keys, with certain parts removed.

Fig. 10 is a face view of the denominational circuit selecting switchboard.

Figure 17:
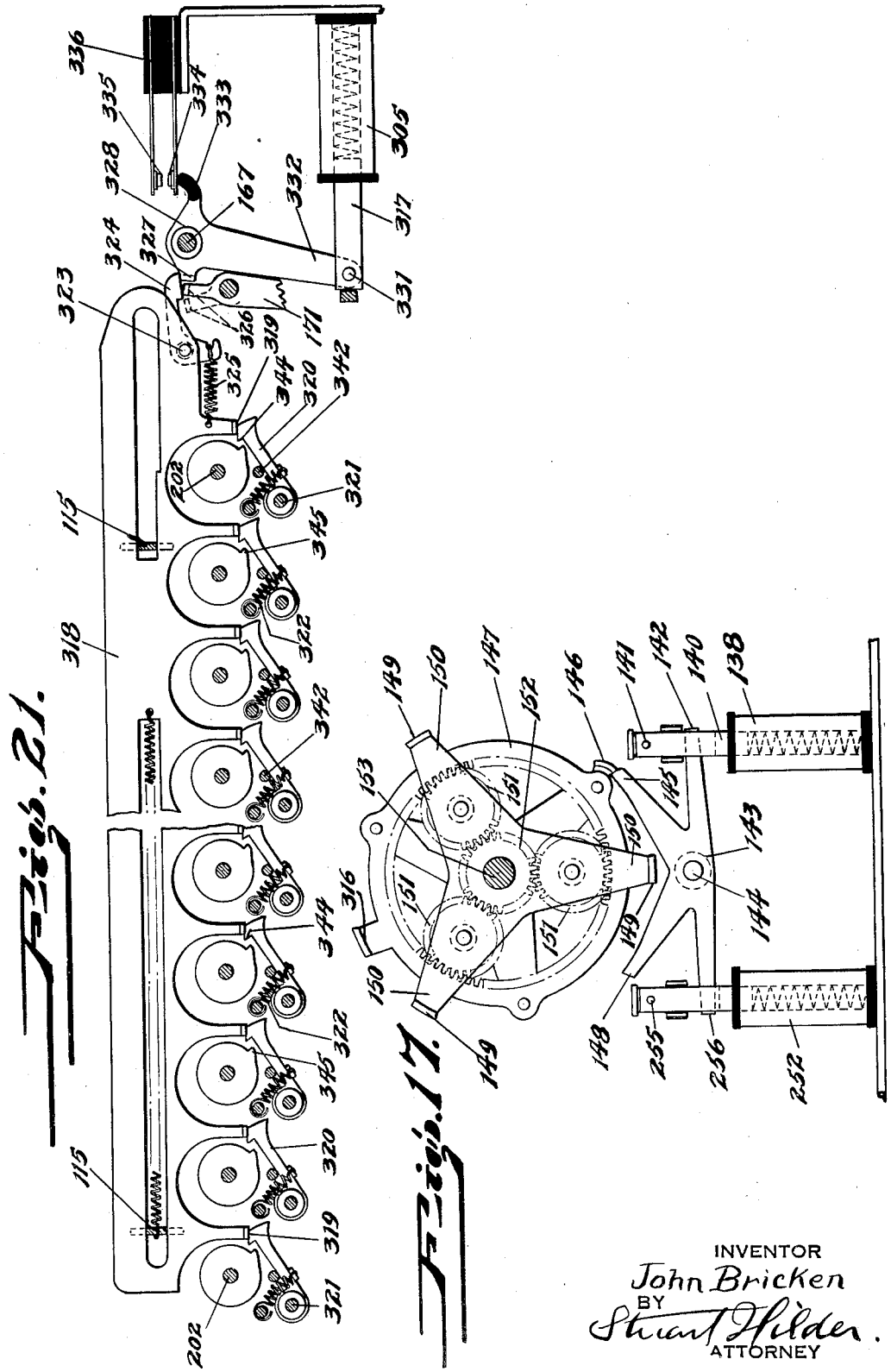

Fg. 11 is a face view of the carriage positioner strip.

Fig. 12 is a face view of the digit level circuit selecting switchboard.

Figs. 13, 14 and 15 are circuit diagrams.

Figure 16:
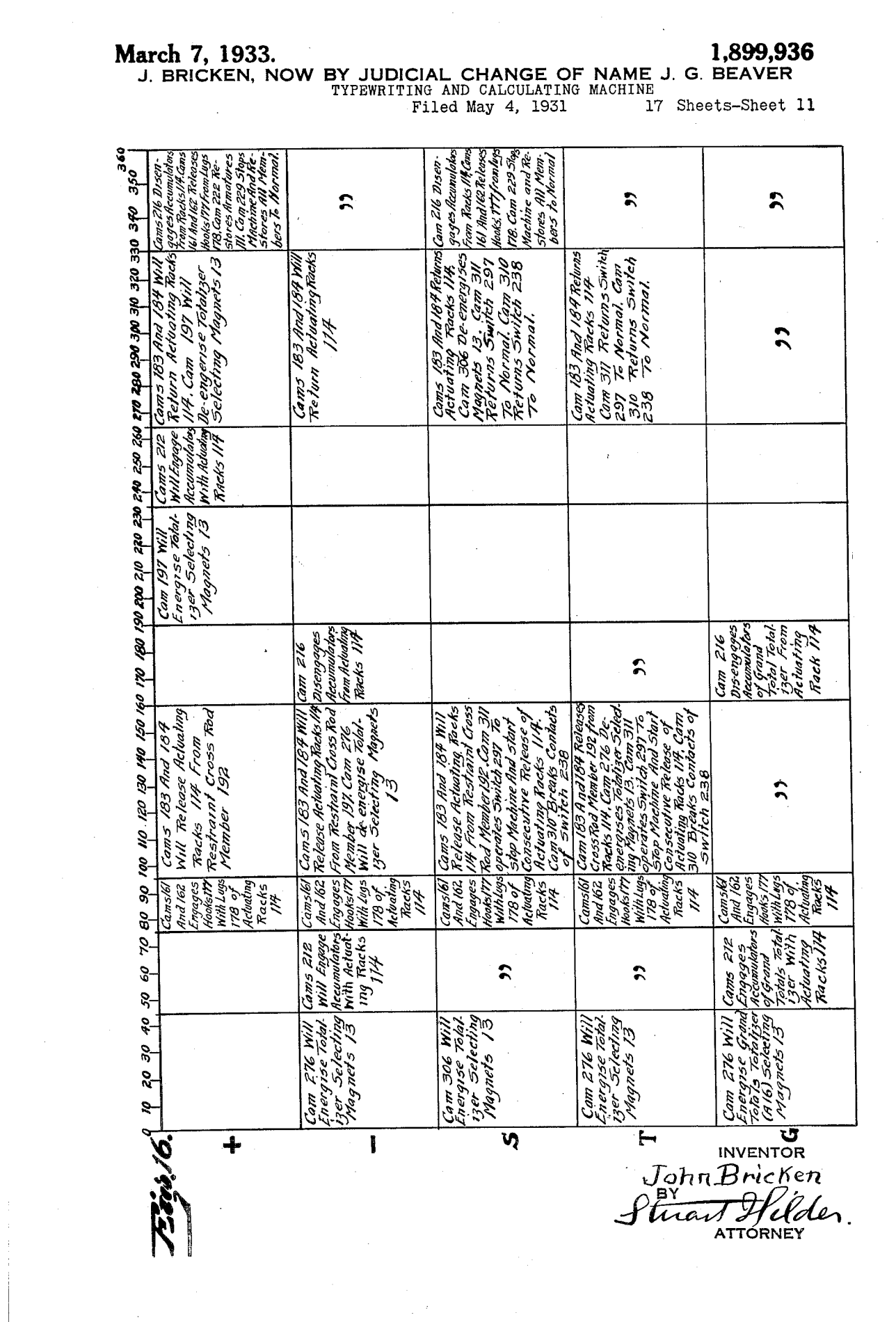

Fig. 16 illustrates diagrammatically the cycles of operation.

Fig. 17 is a left hand elevation of the transmission and starting clutch.

Figure 18:
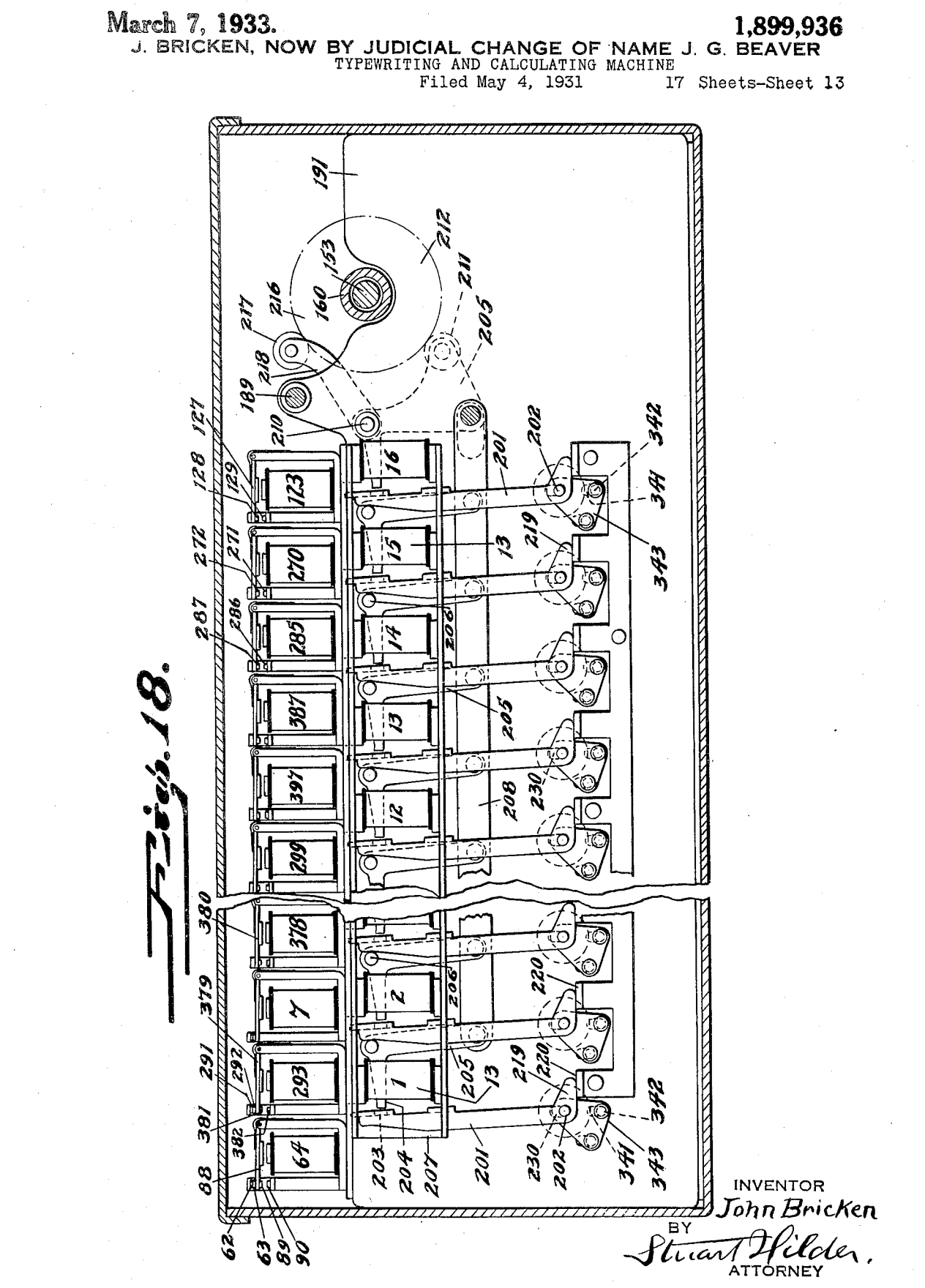

Fig. 18 is a right hand elevation of a unit member, with sides of casing removed.

Fig. 19 is a longitudinal sectional view of certain parts, taken substantially through the center of a unit member.

Fig. 20 is a rear sectional view, taken across a unit member at substantially the center.

Fig. 21 is a right hand elevation detail view, showing a set of zeroizing pawls and releasing mechanism for same.

Fig. 22 is a rear elevation of a unit member.

Fig. 23 is a planular sectional view, taken on line 23—23 of Fig. 19.

Fig. 24 shows the left hand face of the switchboard used when recording totals.

Fig. 25 is a rear view of same.

Fig. 26 is a sectional view taken on line 26—26 of Fig. 25.

Fig. 27 shows the right hand face of same.

Fig. 28 is a detail view.

To simplify the wiring diagram there is shown in the accompanying drawings a single unit comprising sixteen totalizers, however as many such units as desired may be suitably connected to the power drive shaft and inserted into the wiring hook up, any unit being adapted to be selectively operated, as will be described later.

As the best means of describing the circuit and operations of the machine we will take the value 756 and first add the same into a given totalizer, taking for this purpose totalizer eight.

As previously stated, there are sixteen totalizers in each unit, and any desired number of units, therefore, as a means of identification, the various units will be lettered A, B, C etc. and the totalizers numbered from one to sixteen, that is, the totalizers of unit (A) will be designated as A1, A2, etc., of unit (B) B1, B2, etc.

To add the above value 756 into the accumulators of totalizer A14, select the unit A by depressing and releasing the unit selecting key A (Figs. 1, 5, 9 and 15), there being a unit selecting key A, B, C etc. for each unit said keys being adapted to operate by upward spring movement, upon release of a detaining latch in accordance with the disclosure set forth in patent application Serial No. 518,935.

Operation of the unit selecting key A will cause the cross-tree member 1 (Fig. 15), pivotally mounted thereon, to bridge the pins 2 and 3, to thereby extend the positive circuit from the positive service line 4 through leads 5 and 6 (Fig. 14) to the normally closed points 8 and 9 of a relay switch member 7 and thence, through the lead 10, to the positive poles of a series of digit magnets 11 (Figs. 14, 19 and 20). There are nine of said magnets in each denominational order, and ten denominational orders, as will be more fully described later. The circuit from lead 5 is also extended, through lead 12, to the positive poles of a series of totalizer selecting magnets 13 (Figs. 14, 18 and 20), there being 32 of said magnets, located sixteen on either side of the machine, as will be described later.

Having thus selected the desired unit, by closing the positive circuit to the same, the desired totalizer, number eight, is selected in the following manner:

A switchboard member 14 (Figs. 1, 2, 3 and 10), suitably supported upon the rear framing of the typewriter, as shown, is composed of sixteen groups of circuit pins 15, each group adapted to control the circuits to a corresponding totalizer, as will hereinafter be described.

An indicator strip 16 (Figs. 1 and 11), mounted upon the forward edge of the carriage 17, is divided into sixteen equal spaces, corresponding to the sixteen groups of circuit pins in the switchboard 14.

To select any desired totalizer the carriage 17 is shifted to the space corresponding to the preceding totalizer, that is, to select totalizer number eight the carriage is shifted to bring the space seven to indicating position, as read through the sight opening 18 (Fig. 1).

The tabular key 19 is then operated, whereupon the carriage will escape toward the left in the usual manner until stopped in the regular way by means of the tabulator stops 20 (Figs. 1 and 2). The tabulator stops 20 are spaced at definite intervals, corresponding to the spacing of the group of pins 15, and will now cause the carriage to be positioned so that a series of wipers 21, (Figs. 2, 13 and 28), mounted upon the rear surface of an insulated arm 22, supported upon the cross-rod 23 of the carriage, will be in contact with the right hand or highest order of the pins 15 in group eight.

There are thirteen of said wipers 21, mounted one above the other as shown in Figs. 2 and 13, each wiper being connected by means of pins 23 to corresponding wipers 24 mounted upon the forward surface of the arm 22 and having engagement with corresponding level contact strips 25 of a switchboard member 26 (Figs. 12 and 13).

Note that the strips 25 of Fig. 13 are reversed for simplicity of illustration.

The top level wiper 21 now being in contact with a contact strip 27 of switchboard 14, will extend a negative circuit line from the negative poles of the number eight totalizer selecting magnets 13 to one terminal 28 (Fig. 15) of a cam-controlled switch member 29 (Figs. 15 and 22) through leads 30 strip 27, wiper 21, wiper 24, contact strip 25, and lead 31. There is a contact strip 27 for each pair of totalizer selecting magnets 13 as shown.

As shown in Figs. 10 and 13, the circuit pins 15 of switchboard 14 are arranged in ten vertical columns, there being ten pins in each column, arranged according to digit values from 0 to 9, the top level being zero, the next level one, etc. The left hand column of pins control the circuits for the lowest or units order, the next right hand column the tens, etc.

The carriage is now brought to the proper denominational position by means of denominational keys 431 (Figs. 1, 2, 6 and 15), in the following manner. Depress the denominational key 431 corresponding to the number of places or denominations that occur in the value to be added, in this instance the number 3 key, since there are three denominations to the value (756).

Depression of the number three denominational key 431 will cause said key to contact the points 32 and 33 of a switch member 34 corresponding to said key, there being in all nine keys and nine corresponding switches. As shown in Fig. 15, the contacting of points 32 and 33 of switch 34 will extend the negative service line 35 to the negative pole of a corresponding solenoid 36 (Figs. 2, 3 and 15), there being a solenoid 36 for each denominational key. Depression of a denominational key will also cam a slide member 37 toward the right and an insulated tip 38, mounted thereon, will cause the contacting of points 40 and 41 of a switch member 42, to thereby extend the positive circuit from the main service line 4 to the positive poles of solenoids 36 and, the negative circuit to the number 3 solenoid being closed as previously described, said solenoid will become energized and attract its plunger 43.

The plungers 43 are pivotally connected to one end of a series of denominational positioning levers 44 (Figs. 1, 2, 3, 4 and 15), loosely mounted upon a shaft 45, extending transversely of the machine and suitably supported in the casing, as shown. There are ten denominational positioning levers 44, corresponding to the ten solenoids 36, there being ten denominational places provided in the machine.

Since, as previously described, the tabulating key 19 positioned the carriage in the highest denominational order, only nine denominational keys are required. However, there are ten solenoids and ten corresponding carriage positioning levers 44, the tenth or highest order lever being needed when totals are being taken, as will hereinafter be described.

The particular carriage positioning lever 44 operated by its corresponding solenoid 36 is adapted to position the carriage to bring the wipers 21 of arm 22 into contact with the corresponding denominational order of pins 15 in the selected group eight, in the following manner:

The attraction of plunger 43 of the number three solenoid, as previously described, will rock the corresponding positioning lever 44 counter-clockwise about shaft 45, to thereby advance the end 46 of said lever to a position overlying the path of movement of a series of equally spaced projections 47, mounted upon the carriage escapement rack 48.

The above described movement of the positioning lever 44 will also cause the rear surface of said lever to engage a cross-rod member 49 (Figs. 2, 3, 4, and 15), extending transversely of the levers 44 and supported at either end by the links 50 and 51, said links being pivotally mounted upon the pins 52 and 53, as shown in Fig. 4.

The engagement of lever 44 with rod 49 will rock said rod rearwardly, to cause an insulated finger 54, fast to same, to engage a switch member 55 and cause the contacting of points 56 and 57 of said switch (Fig. 15). The contacting of points 56 and 57 of switch 55 will close the circuit from the main positive service line 4 to the positive pole of a solenoid 58 (Figs. 2A and 15), through the following leads: 59, 60, 61, the normally closed contacts 62 and 63 of a relay switch member 64, lead 65, points 56 and 57 of switch 55 and lead 66. The negative circuit of said solenoid being continuous to the main negative service line 35, through leads 67, 68, the contact points 69 and 70 of a cam-controlled switch member 71, and leads 72 and 73, said solenoid will become energized and attract its plunger 74.

An arm 75, extending through a slotted opening in the plunger 74, is pinned to a shaft 76, mounted in the casing of the machine as shown. Fast to the opposite end of shaft 76 is a lever 77, extending beneath the carriage escapement rack 48 as shown in Figs. 2 and 4.

The attraction of plunger 74 will cause a pin 78, fast to said plunger, to engage the arm 75 and rock the shaft 76, to thereby cause lever 77 to raise the carriage escapement rack, whereupon the carriage will again escape toward the left, until stopped by means of one of the projections 47 coming in contact with the advanced end 46 of the denominational stop lever 44.

As illustrated diagrammatically in Fig. 15, when the end 46 of a positioning lever 44 is advanced it will be extended through a slotted aperture 79 of a slide member 80, slidably mounted upon a guide bracket 81 as shown in Figs. 2 and 4. As the projection 47 of rack 48 strikes the end 46 of lever 44, it will thrust said lever slightly sideways, until stopped by the edge 82 of the guide bracket 81. This slight lateral movement of the lever 44 is imparted to the slide member 80, and an insulated pin 83 mounted thereon will cause the contacting of points 84 and 85 of a switch member 86. The contact point 85 of said switch is connected directly through leads 60 and 59 to the positive service line 4 and will therefore extend said circuit through contact 84 and lead 86 to the positive pole of relay member 64, and the negative pole of said relay being connected to the negative service line 35, through leads 87, 67, 68, contact points 69 and 70 of switch 71, lead 72 and lead 73, said relay will become energized and attract its armature 88, thereby breaking the circuit to the solenoid 58, while at the same time contacting the points 89 and 90 of said relay 64.

The circuit thus being broken to solenoid 58, the same will become de-energized and will release its plunger 74, to thereby allow re-engagement of the carriage escapement rack 48 with the usual escapement mechanism, the carriage now being positioned in the proper denominational position, that is, with the wipers 21 contacting with the third left hand column of pins 15, corresponding to the third denominational order. The contacting of points 89 and 90 of relay 64 is for the purpose of re-establishing the positive circuit to said relay, which was also broken when the points 62 and 63 were disengaged. Thus the circuit to solenoid 58 will remain broken, while the relay member 64 will remain energized until its circuit is broken in the manner hereinafter to be described.

The carriage now being in the proper denominational position, the value 756 is typed in the usual way that is, from the higher to the lower denominational order, the consequent escapement of the carriage bringing the wipers 21 into contact with the corresponding denominational column of contact pins 15 as each value is typed.

As shown in Fig. 2, there is pivotally connected at 91 to the type bar actuating means, described in Patent 1,614,475, issued January 18, 1927 to O. A. Hokanson, a series of levers 92, there being a lever 92 connected to each of the type bars indicated by the marked type keys in Fig. 1 with the exception of the keys M and P. The free ends 93 of said levers extend through the slotted openings 94 Fig. 4 of a guide plate 95 and are formed as hooks 96, said hooks being adapted to engage with the teeth 97 of a ratchet wheel member 98, loosely mounted upon a shaft 99, extending transversely of the machine as shown, there being a ratchet wheel for each of the levers 92, spaced upon the shaft 99 by means of sleeves 100.

As the value seven is typed, the hook end 96 of the lever 92 secured to the number seven type bar actuating means will engage one of the teeth 97 of the corresponding ratchet wheel member 98 and rotate said wheel one tooth movement. The teeth 97 of the ratchet wheels 98 also have engagement with insulated blocks 101, mounted fast to one arm of a series of corresponding switch members 102. Rotation, therefore, of a ratchet wheel member 98 will cause its teeth 97 to make and break the contact points 103 and 104 of the corresponding switch member 102, said contacting and breaking occurring prior to the escapement of the carriage to the next lower order position.

The contacting of the points 103 and 104 (Fig. 13) of the switch 102 corresponding to the actuated type bar number seven will extend the negative circuit line 35 (Fig. 15), by means of leads 73 and 72, contact points 69 and 70 of switch 71, leads 68, 67 and 105, the contacted points 103 and 104 and lead 106, to the ninth level contact strip 25 of switchboard 26. (Note that the levels of the strips shown in the diagram, Fig. 13, are reversed to simplify the illustration). From this point, the circuit is extended by means of the wipers 24 and 21 to the corresponding level of pins 15 of switchboard 14, and more particularly (with the carriage in the present position) to the ninth circuit level pin in the third left hand column of the pins corresponding to the number eight totalizer in the manner previously described.

The switchboard 14 comprises the sixteen separate contact strips 27 Figs. 10 and 13, having electrical connections with the sixteen pairs of totalizer selecting magnets 13, as previously described, also the group of pins 15, arranged in vertical columns, there being ten pins in each column and ten columns, as was previously described. Each level of the left hand or units column of pins of each group are inter-connected by means of contact strips 106, extending transversely of the switchboard, that is, the zero pins of the units column of each group are inter-connected; the number one pins of the units column of each group are inter-connected, etc. In like manner, each level of pins in the tens column are inter-connected, and so on for each denominational order, the strips 106 being arranged in superposed relation as shown in Figs. 2 and 13, there being ten levels of strips, corresponding to the ten digit levels, and ten strips in each level, corresponding to the ten denominational orders, said strips being suitably insulated by the insulating strips 107.

Also mounted in the switchboard 14 are the sixteen pins $15^a$ and $15^b$, the pins $15^a$ being inter-connected by the strip 108 and the pins $15^b$ inter-connected by the strip 109, to be more fully described later.

Each of the digit pins 15, with the exception of the zero pins, have electrical connection with corresponding digit magnets 11, in corresponding denominational order, that is, the number one pins of the left hand or units column of each group are connected to the digit magnet $1^a$, the number two pins to magnet $2^a$, etc.; the number one pins of the tens columns being connected to magnet $1^b$, the number two pins in the tens column to magnet $2^b$, and so on.

The contacting, therefore, of the wiper 21 with the ninth circuit level pin seven in the third or hundreds denominational column will extend the negative circuits by means of lead 110 to the corresponding digit value magnet 11 in the third denominational order, or magnet $7^c$, and the positive circuit to the digit magnets 11 having been closed, as previously described, said magnet will become energized and attract its armature 111 (Figs. 19, 20 and 23). In like manner, as the values five and six are typed, the corresponding digit magnet of each corresponding denominational order will become energized and attract its armature 111.

The armatures 111, when attracted, will remain in adjusted position through gravity, after the breaking of the circuit. In this position the ends 112 of said armatures into the path of movement of a series of differentially spaced projections 113 of an accumulator actuating rack member 114, there being a rack for each denominational order, or ten in all, supported upon the guide strip members 115 as shown.

The projections 113 are adapted, by contacting with the end 112 of an attracted armature 111, to limit the forward movement of said actuating rack to correspond with the digit value of the energized magnet 11, as more fully described later.

Addition

To add the value 756, depress and release the plus key 116 (Figs. 1, 7 and 15). The operation of the plus key 116 will cause a cross-tree member 117 pivotally mounted thereon, to contact the pins 118 and 119, mounted in an insulated block 120 as shown in Fig. 9 and, since the plus key is grounded to the negative circuit line 35 (Fig. 15), by means of plate 121, leads 67 and 68, the points 69 and 70 of switch 71, and the leads 72 and 73, the negative circuit will be extended to said pins.

The circuit from pin 118 is extended through lead 122 to the negative pole of a relay member 123, and also through lead 124 to a solenoid 125 (Fig. 2). The positive pole of relay 123 is directly connected, through lead 126, to the positive service line 4, therefore said relay will become energized and attract its armature 127, to close the contact points 128 and 129, thereby extending the negative circuit from lead 67 to the terminal 130 of the cam-controlled switch member 29.

The positive circuit of the solenoid 125 is connected through lead 131 to the conductor strip 108 of switchboard 14, having electrical connections with the pins 15ª, and, as the carriage has escaped one place to the left after the units value six was typed, the wiper 21ª will be in contact with said pin and will extend the circuit through wiper 24ª to the corresponding conductor strip 25ª of switchboard 26 whence it is continued by leads 60 and 59 to the main positive service line 4, therefore said solenoid will become energized and will attract its plunger 132 (Figs. 1 and 2). A pin 133, mounted in said plunger, will contact with the stem 134 of the type key P and depress said key, to print the letter P, indicating that a plus operation has been performed.

The circuit from the pin 119 is extended by means of leads 135, 136 and 137 to the negative pole of a starting solenoid 138 (Figs. 15, 17 and 23), and the positive pole of said solenoid being connected, through leads 139 and 5, and the operated group selector key A, to the positive service line 4, said solenoid will become energized and attract its plunger 140 whereupon a pin 141, fast to said plunger, will strike an arm 142 of a clutch member 143 and rock said member clockwise about its supporting shaft 144, to thereby cause an arm 145 of said clutch member to release the lug 146 of an internal tooth or ring gear member 147 of a planetary transmission, while at the same time bringing an arm 148 of said clutch means into the path of movement of lug 149 of one of the arms 150. There are three arms 150, each arm having mounted thereon a planetary gear member 151, said gears having engagement with the ring gear member 147 and with a driving or sun gear member 152, keyed to the drive shaft 153 by means of pin 154 as shown in Fig. 23.

The planetary transmission member is adapted to function in the well known manner, that is, by holding the ring gear 147 stationary the planetary gears 151 will be caused to revolve about the sun gear 152, while by releasing the ring gear 147 and holding the planetary gears 151 from revolving, said planetary gears will rotate the ring gear member 147.

The drive shaft 153, extending transversely of the machine and having suitable bearings in the support brackets 154 and 155, is driven in a counter-clockwise direction by means of a gear 156, keyed to the right hand end of said shaft by pin 157, and having engagement with the pinion 158, fast to the shaft 159 of the motor M (Figs. 22 and 23).

The ring gear 147 is fast upon one end of a hollow shaft 160, suitably supported as shown in Fig. 23, and having mounted thereon a series of operating cams, as shown in Fig. 22, the various functions of which will later be described.

As previously described, the energizing of solenoid 138 will release the ring gear 147, and as the lug 149 of one of the arms 150 contacts with the arm 148 of clutch member 143, said ring gear will be caused to rotate the shaft 153 in a clockwise direction as viewed in Fig. 17.

The shaft 160 is adapted to make one complete revolution to a cycle of operation, there being certain definite angular portions of the movement of said shaft apportioned to the various operations of the machine, as indicated by the diagram, Fig. 16, and as hereinafter described.

The addition cycle of operation

The addition cycle of operation will function in the following definite order: The similar cams 161 and 162, fast to the shaft 160, have engagement with the respective rollers 163 and 164 of the levers 165 and 166, loosely mounted one on either end of a shaft 167, extending transversely of the machine (Figs. 19 and 22). Supported by the lower end of the levers 165 and 166 is a cross-rod member 168, extending transversely of a series of connecting link members 169, pivotally mounted at their forward end to the levers 170 and at the rearward ends to the levers 171 said levers being loosely mounted upon their respective shafts 172 and 173. The ends 174 of the connecting links 169 are held against the cross-rod member 168 by means of the compression springs 175, mounted within the hollow core of a series of solenoids 176, and connected to the links 169 by links 338 and levers 171. There is a solenoid 176 for each of the connecting links and ten connecting links, corresponding to the ten denominational orders provided in the machine.

As the shaft 160 is caused to rotate in the manner previously described, the cams 161 and 162 will, during a selected portion of the movement of said shaft, release the rollers 163 and 164, and the rod 168 will release the links 169, whereupon the springs 175 will rock their respective levers 171 rearwardly about shaft 173, to thus impart a rearward movement to the connecting link members 169. The rearward movement of the links 169 will rock the levers 170 about shaft 172, to bring the hook ends 177 of said levers into engagement with the lugs 178 of a corresponding actuating rack 114.

However, the armatures 111 of the digit magnets 11, when in attracted position, will have brought the ends 112 of said armatures into the path of movement of corresponding lugs 179 of bars 180, pivotally mounted upon the levers 170, 181 and 182, as shown in Figs. 19 and 20, and said lugs will contact with any attracted armatures 111 to thereby prevent movement of the corresponding lever 170, and the hook ends 177 of said levers will remain free of the lugs 178 of the corresponding actuating racks 114. In the illustrated problem, therefore, the attracted armatures 111 corresponding to the value (756), will hold the hook ends 177 free of the lugs 178 of the actuating racks 114 corresponding to the units, tens and hundreds denominational orders.

As the shaft 160 continues to rotate, the similar cams 183 and 184, fast to said shaft, will release the rollers 185 and 186 mounted upon one end of the levers 187 and 188, fast to a common shaft 189, extending transversely of the machine, and suitably supported in the left and right hand side frames 190 and 191.

Mounted to the lower arms of the levers 187 and 188 is the cross-rod member 192, extending through the slotted openings 193 of the accumulator actuating racks 114 and normally adapted to hold said racks in rearward position, against the tension of their respective springs 194. The release, therefore, of rollers 185 and 186, by cams 183 and 184, will cause the cross-rod member 192 to release the actuating racks 114, whereupon the racks corresponding to the denominational order wherein a digit magnet has been energized, will move forwardly under the influence of its springs 194, until stopped by means of the projection 113 of said racks contacting the ends 112 of the attracted armatures 111, to thus limit the forward movement of said racks; the racks 114 corresponding to the denominational order, wherein no digit magnet has been energized being held in rearward position by the hooks 177 of lever 170 in the manner described.

There are nine digit magnets 11, in each order, corresponding to the digit values from one to nine, but only eight corresponding projections 113 are necessary, the total movement of rack 114 being limited to nine units by means of the ends 195 of said racks contacting with a stop member 196 suitably fastened to the framing of the machine, the number nine magnet being used to hold the hook 177 out of engagement with the lug 178 when a value nine is being registered.

Continued rotation of the shaft 160 will now cause a cam member 197 Figs. 15 and 22 fast thereto and engaging an insulated roller 198 mounted upon one arm of the switch member 29 to effect contact of the points 199 and 200 of said switch, to thereby close the negative circuit line and energize the selected (number A8) pair of totalizer selecting magnets 13, as previously described.

It will be recalled that there are sixteen pairs of totalizer selecting magnets 13 (Figs. 14, 18 and 20), arranged one on each side of the machine as shown, said magnets being adapted to select the desired totalizer, as will now be described.

The energizing of a pair of totalizer selecting magnets 13 will cause said magnets to attract their respective armatures 201, mounted fast one upon each end of the shaft 202, supported in slotted openings 23 of side frame members 190 and 191. Supported upon shaft 202 is a totalizer mechanism, constructed and adapted to function, in the manner described in British Patent #272,569.

The armatures 201 are provided with slotted openings 203, adapted to engage with the fingers 204 of a series of bell crank levers 205, pivotally mounted at 206 upon the selecting magnet support brackets 207, there being a bell crank lever for each of the armatures 201. The sixteen bell crank levers 205 on the right hand side of the machine are pivotally connected to a common connecting link member 208 as shown in Fig. 18, the levers 205 on the left hand side being connected to a similar link 209. The pair of bell crank levers 205 corresponding to the armatures 201 of the number sixteen totalizer selecting magnets are keyed to a common shaft 210, and have mounted thereon the rollers 211, said rollers having engagement with a pair of similar cams 212, as shown in Figs. 18 and 22.

Continued rotation of shaft 160 will now cause the cams 212, acting against the rollers 211, to rock the links 208 and 209 forwardly, and the series of bell crank levers 205 will be moved about their respective pivot points 206, to thereby rock the fingers 204 of said bell crank levers upwardly.

The attracted armatures 201, of the energized number A8 totalizer selecting magnets having engaged said fingers, will be lifted upwardly with the same to bring the teeth 213 of the gears 214 of the accumulators comprising totalizer number A8, into engagement with the teeth 215 of the actuating racks 114.

The cams 183 and 184 will now reengage the rollers 185 and 186 and rock the levers 187 and 188 to normal position, and the crossrod member 192 will catch up and return to rearward position the advanced actuating racks 114, the teeth 215 of said racks rotating the gears 202 of the accumulators of totalizer A8 to transfer the value (756) set up on said racks to said accumulators.

As shown by the diagram of Fig. 16, the cam 197 will also, during this portion of the movement of shaft 160, de-energize the totalizer selecting magnets 13, by disengaging the contact points 199 and 200 of the switch member 29, thus breaking the negative circuit to said magnets.

A cam 216, fast to the shaft 160, will now engage a roller 217, carried by an arm 218 keyed to the shaft 210, and as the cam 212 now releases the rollers 211 of levers 205 the cam 216, by contacting the roller 217 will rock the shaft 210 in a counter-clockwise direction and levers 205 will rock with the same, the fingers 204 of said levers forcing the attracted armatures 201 downwardly, thus disengaging the gears 214 of the accumulators of totalizer A8 from the teeth 215 of the actuating racks 114 and into engagement with the teeth 231 of a comb 232, adapted to lock the accumulators when disengaged from actuating racks 114.

As the armatures 201 are forced downwardly, an arm 219 of said armatures will contact with corresponding projections 220 of members 221 fast to the framing of the machine as shown, to thus disengage the armatures from the fingers 204 of levers 205.

During this same portion of the cycle of operation, the cams 161 and 162 will reengage the rollers 163 and 164, to restore the hooks 177 to normal position out of engagement with the lugs 178 of actuating racks 114.

A cam 222, fast to the shaft 160, will also engage a roller 223 carried by a bell crank lever 224 loosely mounted upon the shaft 210 (Figs. 19, 22 and 23), and rock said lever forwardly about shaft 210. The bell crank lever 224 has engagement with the rear surface of a slidable plate 225, supported in slotted openings of the side frame members 190 and 191 by means of the tongues 226, as shown in Fig. 23, and will slide said plate forwardly against the tension of springs 227, the tongues 226, angularly disposed as shown, causing said plate to be cammed laterally toward the right. This lateral movement will cause the surfaces 228 of plate 225 to contact with and restore any attracted armatures 111 of digit magnets 11, there being a surface 228 adapted to engage the armatures 111 of each denominational order. Armatures 111, being released, will remain in the position illustrated in Fig. 20 by frictional engagement of the shoulders of the armatures with the supporting brackets of the magnets, as shown.

During this last portion of the cycle of operation a cam 229 (Figs. 15, 19 and 22), contacting with an insulated roller 233 carried by one arm of the double contact switch 71, will cause the breaking of contact points 69 and 70 of said switch and the contacting of its points 234 and 235, the cam 229 being constructed to provide a slight delay between the breaking of contact points 69 and 70 and the contacting of points 234 and 235 for a reason to be described later.

Since the various negative circuits previously described are connected directly or indirectly to the terminal 236 of switch member 71 (Fig. 15), the breaking of contact points 69 and 70 will break the negative circuits throughout the machine to thus de-energize and release the attracted armatures 88 and 127 of relay members 64 and 123.

The contacting of points 234 and 235 of said switch 71 will extend the negative service line, through lead 237, to a cam controlled switch member 238, and through the closed contact points 239 and 240 of said switch and lead 241 to the negative pole of a solenoid 242 (Figs. 7, 8 and 15). The positive pole of solenoid 242, being connected by leads 243, 60 and 59 to positive service line 4, said solenoid will become energized and attract its plunger 244. The plunger 244 is pivotally connected at 245 to one arm of a lever 246, fulcrumed at 247 upon the casing containing the plus operation control key 116.

The attraction of plunger 244 will therefore rock the lever 246 about point 247, and a flanged key restoring bar 248, pivotally connected at 249 to said lever, will be rocked downwardly to contact the latching pawl 401 and restore the raised key 116 in accordance with a disclosure of patent application No. 518,935.

The contacting of points 234 and 235 of switch 71 will also extend the negative circuit from said switch, through leads 250 and 251, to the negative pole of a cycle-stopping solenoid 252 (Figs. 15, 17 and 23) and the positive pole of said solenoid, being connected through leads 253 and 139 to the unit positive service line 5, said solenoid will become energized and attract its armature 254. A pin 255 of the attracted armature 254 will engage with the arm 256 of clutch member 143 and rock said member about shaft 144, to thus bring the arm 148 out of engagement with the lug 149 of arm 150 and the arm 145 into the path of movement of the lug 146 of ring gear 147, said ring gear, under the inertia of the various cams supported upon shaft 160, carrying the lug 146 until stopped at the full cycle position by said lug contacting the arm 145 of clutch member 143.

Just prior to the contacting of lug 146 with arm 145 the cam 229 will release the insulated roller 233 of switch member 71, to break the contact of points 234 and 235 and reengage the points 69 and 70 of said switch.

All parts will now have assumed their normal position, with the exception of the units selecting key A, which may either be left in operated position or restored by depressing the restoring key 257 (Figs. 1 and 5), said key being adapted to restore the operated selecting key A by means of pin 258, mounted upon the stem of the restoring key 257. engaging the slotted opening 259 of a lever 260, fulcrumed upon the casing at 261, and rocking said lever about point 261, to rock the restoring bar 262 (pivotally connected at 263 to said lever) downwardly, said restoring bar 262 being adapted to restore the operated units selecting key A, as described above in relation to key 116.

In addition the operation of the plus key 116 (through the circuits illustrated in Figs. 14 and 15, comprising leads 135 and 298, contacts 296 and 295 of switch 297, lead 294, contacts 291 and 292 of relay 293 and lead 290) will close the circuit to relay 299 and energize same to thus close the positive circuit to solenoids 176.

During the following cycle of operation cam 311 will contact points 314 and 315 extending the negative circuit to said solenoids, however the breaking of points 295 and 296 will break the circuit to relay 299 to thus release its armature 301 to break the points 302 and 303 thus breaking the positive circuit to said relays there being sufficient time between the breaking of points 295 and 296 and the engaging of points 314 and 315 to allow armature 301 to break points 302 and 303 thereby preventing operation of solenoids 176.

Subtraction

The machine is adapted, with the following exceptions, to perform operations of subtraction in a manner similar to that described for addition.

It will be recalled, and shown by the diagram of Fig. 16, that the actuating racks 114 were released prior to the engagement of gears 214 of the accumulator mechanism with said racks, to provide for the value set up on said actuating racks being transferred to the accumulators during the return movement of the racks.

In subtraction it is necessary to rotate the gears 214 of the accumulator mechanism in the opposite direction to that imparted by the racks in additive operation. To do this, the actuating racks 114 are adapted to be engaged with the accumulator mechanism prior to the release of said racks in the following manner:

A minus key 264 (Figs. 1, 7 and 15) is operated in preference to the plus key 116, whereupon a cross-tree member 265, mounted upon the minus key, will contact with the pins 266 and 267. The negative circuit is thus extended to said pins in the manner described for addition, the circuit from the pins 267 extending through lead 268 to the lead 135, whence it will continue as previously described.

The circuit from the pin 266 however will be extended through lead 269 to a relay member 270, corresponding to the (+) relay 123, but adapted when energized to engage contact points 271 and 272, to extend the negative circuit from lead 67, through leads 273 and 274, to a switch member 275 adapted to be controlled by the minus cam member 276 (Figs. 14 and 22).

In like manner to that described for typing the letter (P) in a plus operation, the operation of the minus key 264 will energize a solenoid 277, to operate the type bar bearing the letter (M) indicating that a minus operation has been performed.

The minus cycle of operation, shown by the diagram of Fig. 16, will now occur, the cam 276 contacting the points 278 and 279 of the switch 275 to energize the totalizer selecting magnets 13; and the cams 212 engaging the gears 214 with the actuating racks 114 before the release of said racks, to subtract from the accumulator mechanism the value set in said racks by the digit magnets 11.

To take a sub-total

Sub-total values are adapted to be automatically typed in the following manner:

The desired totalizer is selected by setting the carriage 17 in the manner previously described for addition, that is, with the wipers 24 contacting the highest denominational order of pins 15 of the group corresponding to said totalizer.

A sub-total key 280 (Figs. 1, 7 and 15) is then operated, to bring a cross-tree member 281, mounted thereon, into contact with the pins 282 and 283 (Fig. 15), to close the negative circuit to said pins in the manner described for pins 118 and 119 upon operation of the plus key 116.

The negative circuit from pin 282, extended by means of lead 284 to the negative pole of a relay member 285, will energize said relay, to cause the contacting of points 286 and 287, to extend the negative circuit from lead 67 to one terminal of a cam-controlled switch member 288.

The negative circuit is adapted to energize the cycle starting solenoid 138, said circuit being extended from pin 283 through leads 289 and 290, normally closed contact points 291 and 292 of a relay member 293, lead 294, normally closed contact points 295 and 296 of a cam-controlled switch member 297 and leads 298, 136 and 137. The energizing of solenoid 138 will start rotation of the shaft 160 in the manner previously described, and the various operating cams mounted thereon will function in the order shown by the diagram of Fig. 16 and as will more fully be described.

The circuit from pin 283 is also extended through leads 289 and 290 to the negative poles of relay members 7 and 299. The positive circuits of said relays being connected to the units positive service line 5, said relays will become energized and attract their respective armatures 300 and 301. The attracted armature 300 will disengage the normally closed contact points 8 and 9, to break the positive circuit to the digit magnets 11, while the attracted armature 301, by contacting points 302 and 303, will extend the positive circuit through lead 304 to the positive poles of the series of solenoids 176 (Figs. 14, 19 and 22) and also of a solenoid 305 (Figs. 14, 21 and 22).

As shown by the diagram of Fig. 16, rotation of shaft 160 in a sub-total cycle of operation will cause first; the energizing of the selected totalizer selecting magnets 13, by means of a cam member 306 (Figs. 15 and 22) engaging an insulated roller 307 mounted upon one arm of the switch member 288, contacting the points 308 and 309 of said switch, closing the circuit to said magnets in the manner described for the plus and minus cams 197 and 276.

The cam 212 will now engage the gears 214 of the selected totalizer with the actuating racks 114.

Cam 161 will next engage hooks 177 with lugs 178 of actuating racks 114 to lock said racks in rearward position, upon the subsequent releasing of said racks from the restraint of cross rod member 192, by means of cams 183 and 184.

As shaft 160 continues to rotate, the cam 311 fast thereto will engage the insulated roller 313 of the switch member 297, to break the contact of points 295 and 296, while contacting the points 314 and 315 of said switch.

As previously described, the negative circuit to the starting solenoid 138 is extended through said switch and therefore the disengaging of contact points 295 and 296 will break the circuit to said solenoid. The contacting of points 314 and 315 of switch 297 will however extend the circuit through leads 250 and 251 to the cycle stopping solenoid, to energize said solenoid and operate the clutch member 143, and a projection 316 (Fig. 17) of ring gear 147, contacting the arm 145 of clutch member 143 will stop the rotation of shaft 160 at approximately mid-cycle position.

As shown by Fig. 15, the circuit from lead 250 is also extended to the operating key restoring solenoid 242 previously described, however a cam 310, fast to shaft 160, by releasing the insulated roller 310 of switch 238, will cause the disengaging of points 239 and 240 of said switch prior to the contacting of points 314 and 315 of switch 297, to thus prevent the energizing of solenoid 242 at this time.

The contacting of points 314 and 315 is also adapted to extend the negative circuit to the solenoid 305 (Figs. 15, 21 and 22), and the positive circuit to the same having been closed by the contacting of points 302 and 303 of relay 299, as previously described, said solenoid will become energized and attract its plunger 317.

As shown in Figs. 20, 21 and 22, there is slidably mounted upon the support members 115 a series of frame members 318, there being a frame 318 for each denominational order of accumulators provided in the machine.

Each of the frames 318 extends longitudinally of the machine and is provided with a series of projections 319, having engagement with corresponding zeroizing pawls 320, mounted upon transversely extending shafts 321 (there being a zeroizing pawl for each accumulator provided in the machine) to hold said pawls against the tension of their respective springs 322.

Pivotally mounted at 323 upon the frames 318 are dogs 324 normally held, against the tension of springs 325, out of the path of movement of the projections 326 of the levers 171 by means of the cross-rod 327 of a lever 328, secured upon the left and right hand ends of the shaft 167 by the pins 329 and 330.

The plunger 317 of solenoid 305, being pivotally connected at 331 to an arm 332 of lever 328, will rock said lever counter-clockwise about point 167, to thereby release the dogs 324 and allow the same to engage the projections 326 of lever 171, said lever having previously been rocked when hooks 177 were engaged with lugs 178 of the actuating racks 114 to the position indicated by the dotted lines of Fig. 21. The rocking of lever 328 will also cause an insulated arm 333 of said lever to contact the points 334 and 335 of a switch member 336.

Since it is necessary when taking totals to take up the creep that occurs in accumulators of the crawl carry type, the actuating racks 114 are adapted to be consecutively released from the lower to the higher order denomination in the following manner:

The contacting of points 334 and 335 of switch 336 is adapted to extend the negative circuit and energize the number one solenoid 176, there being ten solenoids 176 corresponding to the ten denominations provided in the machine, as previously described.

The energizing of the number one solenoid 176 will cause said solenoid to attract its plunger 337. The attraction of plunger 337 will cause a link 338 pivotally connected at 339 to said plunger and at 340 to lever 171, to rock said lever 171 clockwise about point 173, and the projection 326 of said lever, having engagement with the corresponding dog 324, will slide rearwardly the frame 318, adapted to release the zeroizing pawl 320, corresponding to the lowest denominational order accumulator of the selected totalizer.

Extending transversely of the machine and guided by slotted openings 341 in the framing thereof (Figs. 18, 20 and 21) is a series of rods 342 supported at the ends by means of members 343, loosely mounted upon the totalizer shafts 202, there being a rod 342 for each totalizer, adapted to be lifted with the shaft 202 when the corresponding totalizer is brought into engagement with the actuating racks 114.

The releasing therefore of the above described pawl 320 will allow said pawl, under the influence of its spring 322, to be rocked about point 321 to bring the hook end 344 of the pawl into the path of movement of a corresponding projection 345 of the lowest order accumulator member of the selected totalizer, the pawls 320 corresponding to the lower orders of the remaining totalizers being held out of engagement with said totalizers by means of their respective rods 342.

Further movement of the plunger 337 of the number one solenoid 176 will now release the lower order actuating rack 114, by disengaging the hook 177 of said rack, from the projection 178 of said rack, to allow said rack, under the influence of its springs 194, to be advanced until stopped, by the projection 345 of the engaged lower order accumulator contacting the hook 344 of the zeroizing pawl 320, the forward movement of rack 114 thus being limited to correspond with the value registered upon said accumulator.

Further movement of the plunger 337 will now cause the insulated end 346 of link 338 to contact the points 347 and 348 of a corresponding switch member 349, to thereby close the negative circuit and energize the next higher order releasing solenoid 176, said solenoid being adapted in similar manner to zeroize the next higher order accumulator member and energize the next higher order solenoid, and so on throughout each order provided in the machine.

Connected to the plungers 337 of each releasing solenoid 176 is a dash-pot mechanism 350 (Figs. 19 and 20) adapted to control the movement of each plunger 337, so that the pawls 320 will have time to be brought into the path of movement of the projections 345 before the corresponding actuating rack 114 is released, said dash-pot mechanism also being adapted to allow time for a full movement of said rack before the energizing of the next higher order solenoid 176 by the contacting of points 347 and 348 of switch member 349.

Mounted upon and insulated from the rearward end of the actuating racks 114 is a contact member 351 provided with three prongs or wipers 352, 353 and 354 (Figs. 14, 19 and 23). The wipers 352 have engagement with corresponding contact strips 355 mounted upon one face of arms 356 of a switchboard member 357 (Figs. 19, 24, 25, 26 and 27).

A series of contact strips 358 projecting through the opposite face of the arms 356 of switchboard 357 are adapted to be contacted by the wipers 353, as diagrammatically illustrated in Fig. 14, there being ten strips 358, corresponding to the digit values zero to nine, the wipers 353 being normally in engagement with the zero strip, as shown.

Forward movement of an actuating rack 114 will cause its wiper 354 to engage a corresponding contact strip 359, mounted upon the arm 356 of switchboard 357, the wipers 354 being out of engagement with said strip when the racks 114 are in normal position.

As previously described, the forward movement of the racks 114, as they are consecutively released by solenoids 176 is limited to correspond with the value registered upon the accumulators. The wipers 353 will therefore be brought into engagement with the corresponding value contacts 358, and said contacts, being inter-connected to the corresponding digit value pin 15 (of switchboard 14) of the corresponding denominational order, are adapted to extend the negative circuit to said pins in the following manner:

The contacting of points 334 and 335 of switch 336 will extend the negative circuit from the previously contacted points 314 and 315 of switch member 297 to the contact strip 355 of the units denominational order, as shown, while the subsequent contacting of points 347 and 348 of switch members 349 will extend the negative circuit of lead 73 to the corresponding contact strips 355 of the higher denominational orders, and thence through the respective wipers 352 and 353, the engaged contact strips 358 and corresponding leads 360 to the corresponding digit level value strip 106 (of switchboard 14) of the corresponding denominational order. Said strips, being connected to the pins 15, in the manner previously described, will extend the negative circuit to the pins 15 of corresponding digit values in corresponding denominational orders.

It will be recalled that the carriage is positioned so that the wipers 21 are in contact with the highest denominational order of pins 15 corresponding to the totalizer from which a sub-total is desired, and said carriage will now be shifted automatically to a position corresponding to the highest order digit value registered on said totalizer, in the following manner:

The contact strips 359 of the switchboard 357 are connected through leads 361 to the negative poles of the corresponding carriage denominational positioning solenoids 36, and, as an actuating rack 114 is released, the wipers 352 and 354 will extend the negative circuit to the corresponding solenoid 36. The subsequent energizing of the highest order releasing solenoid 176 then acts by contacting the points 347 and 348 of the corresponding switch 349, to close the positive circuit from lead 4, to thus energize the solenoids 36 corresponding to the denominations of the accumulators wherein any value other than zero is registered.

The energizing of solenoids 36 effects the release and shift of the carriage 17 to the highest denominational order wherein the stop member 44 is operated by its solenoid 36, in the same manner as previously described for addition, to thus bring the wipers 21 in engaged position with the pins 15 corresponding to the highest denominational order of the value registered on the totalizers. The digit value circuit of said order having been closed, as previously described, to the corresponding value level of pins 15, the circuit of said particular pin will be extended to the negative pole of a corresponding value solenoid member 362 (Figs. 1, 2 and 13), there being a solenoid 362 for each digit value from 0 to 9.

The positive circuit to the solenoid members 362 is adapted to be closed in the following manner:

It will be recalled that as the carriage came to rest in proper denominational position it caused the energizing and contacting of points 89 and 90 of a relay member 64. The contacting of the points 89 and 90 of said relay is adapted to extend the positive circuit through leads 363 and 364 to one terminal 365 of a switch member 366. (Figs. 7 and 13). The previous operation of the sub-total key 280, by means of the cam edge 367 of said key engaging and camming a plate 368, has caused the insulated end 369 of said plate to contact the points 370 and 371 of switch member 366, and the positive circuit will thus continue through lead 372 to the positive poles of the solenoids 362, and the negative circuit to the solenoid 362 corresponding to the digit value of the highest order of the value registered upon the totalizer will become energized and attract its plunger 373.

The attraction of the plunger 373 will cause a pin 374 of said plunger to engage and depress the type key 375 corresponding to said value, to cause said value to be typed in the regular way, and the carriage, escaping and making a one step movement, will bring the wipers 21 into contact with the next lower order of pins 15, whereupon the circuit level pin 15 corresponding to the digit value circuit extended from the digit strip 358 of said order, will energize the corresponding solenoid 362, to type said value in the manner just described.

In like manner, the remaining values registered upon the totalizer members are adapted to be recorded.

Upon the typing of the lower or units order value, the carriage, having escaped one step toward the left, will now bring the wiper 21ª into contact with the pin 15ª, to thus extend the positive circuit to a solenoid 376, in the same manner as described for solenoid 125 in addition, and the negative circuit to said solenoid 376 having been closed by operation of the sub-total key 280, said solenoid will become energized and will attract its plunger, to cause the typing of the letter (S) indicating that a sub-total operation has been performed. The typing of the letter (S) will also restart the interrupted cycle of operation in the following manner:

As previously described, each of the type bars bearing the type indicated in Fig. 1 has pivotally connected at 91 (Fig. 2) to the actuating means therefor a lever 92 provided with a hook end 96 adapted to engage the teeth 97 of a corresponding ratchet wheel 98.

The typing of the letter "s" therefor will cause the hook end 96 of the related lever 92 to rotate the corresponding ratchet wheel 98 one tooth movement.

The above described movement of said ratchet wheel 98, will cause the contacting of points 399 (Fig. 3) of a corresponding switch 400 in similar manner as described for the contacting of points 103 and 104 of switch 102 when introducing values into the machine. Contacting of points 399 of switch 400, operated by the type bar bearing the letter (S), will extend the negative circuit from lead 67, through lead 377 to the negative poles of relay members 293 and 378, and the positive poles of said relays being connected, through leads 60 and 59, to the main positive service line 4, said relays will become energized and will attract their respective armatures 379 and 380.

The attraction of armature 379 of relay 293 will disengage the points 291 and 292, while contacting the points 381 and 382 of said relay. The breaking of the contact points 291 and 292 will break the negative circuit, (the operated sub-total key 280, pin 283, leads 289 and 290, points 291 and 292, lead 294, contacted points 314 and 315, and leads 250 and 251) to the cycle-stopping solenoid 252. The contacting of the points 381 and 382 of relay 293 is adapted to extend the negative circuit to the negative poles of said relays, to keep the same energized, since the circuit from the points 399 and 400 is merely held during the operation of the type bar.

The attracted armature 380 of relay 378 is adapted by contacting the points 383 and 384, to extend the negative circuit from the operated sub-total key 280 to energize the starting solenoid 138 (the circuit comprising pin 283, leads 289, 290 and 385, points 383 and 384 and lead 137), to thus restart the interrupted cycle of operation.

Rotation of shaft 160 will now cause the cams 310 and 311 to restore their respective switch members 238 and 297 to normal position, while the cam 183 will return the actuating racks 114 to normal position, in the manner previously described, to thus restore the sub-total value back into the accumulators. The sub-total cam 306 will also at this time release the roller 307 of switch 288, to disengage the contact points 308 and 309, thus breaking the circuit to the totalizer selecting magnets 13.

Further rotation of shaft 160 will then cause the cam 216 to restore the attracted armatures 201 and disengage the accumulators from the actuating racks 114.

The cam 229 will now break the negative circuit throughout the machine, to restore to normal any relays or solenoids still remaining energized, said cam also being adapted to cause the restoring of the operated sub-total key 280 and the stopping of the machine at full cycle position in the manner previously described for addition.

Totals

Total values are adapted to be typed in the same manner as just described for sub-totals, with the exception that the operation of the total key 386 will energize a relay member 387, adapted to extend a negative circuit to the switch 275, controlled by the cam 276, said cam being adapted to time the disengaging of the accumulators from the actuating racks 114 prior to the release of said racks in the manner previously described for subtractive operations, to thus leave the accumulators at zero registering position.

A solenoid 388 will also cause the letter T to be typed, indicating that a total value was taken.

Grand total

One of the totalizers of one unit member is adapted to be used for grand totals, as will now be described.

The particular unit member wherein is located the grand totals totalizer members will therefore be considered as comprising only fifteen totalizers, and one grand totals totalizer, adapted to be operated as previously described, with however the following circuit changes:

The positive circuit to the digit magnets 11 will not pass through the units selecting key A, B, C etc., but will be connected directly to the positive service line 4, to thus cause said magnets to be energized in conjunction with the energizing of any corresponding magnets 11 of any other unit.

The positive circuit line to the totalizer selecting magnets 13 will be the same as previously described, with the exception that only fifteen totalizers will be included in the circuit, the sixteenth, or grand totals totalizer, being adapted to be operated by means of the following circuits:

The positive poles of the magnets 13 corresponding to said totalizer are connected directly, by lead 389, to the main positive service line 4. The negative circuit is extended through leads 390, the normally closed points 391 and 392 of switch members 393 and 394 (arranged in series, as shown in Figs. 7 and 15) and through lead 395 to the common lead 31 of the cyclic operation switch members 29, 288 and 275, controlled by the respective cams 197, 306 and 276, in the manner previously described.

The operation therefore of the cams 197 or 276 in a plus or minus cycle of operation, to add or subtract a value from any selected totalizer, will also cause said value to be added or subtracted in the grand totals totalizer.

Since in the taking of a total or sub-total the grand totals totalizer is not affected, and more particularly since the taking of a total or sub-total of any totalizer located in the same unit member with the grand totals totalizer would be interfered with, the negative circuit to the grand totals totalizer is adapted to be broken by the operation of either the totals or sub-totals operation keys 280 and 386, by means of the stems of said keys breaking the contact points 391 or 392 of switch members 393 or 394.

Grand totals values are adapted to be printed in similar manner to that described for totals and sub-totals, a grand totals operation key 396 being adapted to extend the negative circuit from said key, to energize a relay member 397, and thus extend a negative circuit to the switch 275, controlled by the cam 276 controlling the grand totals cycle of operation in the manner described for totals, the circuit now however being extended from said switch to the grand totals totalizer as previously described.

A solenoid 398 is also provided, adapted to cause the typing of the letter (G), in the manner previously described, to indicate that a grand total value has been taken.

I claim:

1. Register mechanism comprising a plurality of multiple order totalizers, a typewriter control unit, including a shiftable platen carriage, connections between said typewriter and said totalizers including settable control elements connected each with a selective unit comprising a plurality of totalizers, a stationary control elements, control elements mounted upon said carriage and cooperating with said stationary elements to select a single totalizer of any selected unit, and means for operating the selected totalizer.

2. Register mechanism comprising a plurality of totalizers operable to register positively or negatively, a typewriter control unit provided with number type and symbol type, connections between said typewriter and said totalizers including control elements connected each with a selective unit comprising a plurality of totalizers, control elements each operable to select a single totalizer of any selected unit, and means for selectively operating the selected totalizer to register positively or negatively and for automatically typing a corresponding symbol.

3. Register mechanism comprising a totalizer, a typewriter including type members individually movable to a common printing point, and a platen carriage, control connections between said typewriter and said totalizer, operable in given positions of said carriage to register amounts printed by the type members, and cooperating control connections between said totalizer and said typewriter, operable in the same carriage positions to select and actuate the type members in accordance with a registration standing in said totalizer.

4. Register mechanism comprising a plurality of totalizers, a typewriter including type members individually movable to a common printing point, and control connections between said totalizers and said typewriter, including elements operable to place a selected totalizer in control, and elements operable to select and actuate the type members in accordance with a registration standing in the selected totalizer.

5. Register mechanism comprising a plurality of totalizers, a typewriter including type members individually movable to a common printing point, and control connections between said totalizers and said typewriter, including control elements connected each with a selective unit comprising a plurality of totalizers, control elements each operable to place a single totalizer of any selected unit in control, and elements operable to select and actuate the type members in accordance with a registration standing in the selected totalizer.

6. Register mechanism comprising a totalizer, a typewriter control unit including type members and a platen carriage, control connections between said totalizer and said typewriter including contacts adapted to determine a selective denominational connection according to the position of said platen carriage, means for actuating the type members successively in accordance with a registration standing in said totalizer, and means automatically operable by the actuating means to shift said carriage from any one of a plurality of positions into the highest denominational order to be printed.

Signed at Orange, in the county of Essex and State of New Jersey this 30th day of March A. D. 1931.

JOHN BRICKEN,
*Now by Judicial Change of Name John George Beaver.*